(12) United States Patent
Deshpande

(10) Patent No.: US 12,225,235 B2
(45) Date of Patent: Feb. 11, 2025

(54) SYSTEMS AND METHODS FOR SIGNALING REFERENCE PICTURE LISTS IN VIDEO CODING

(71) Applicant: Sharp Kabushiki Kaisha, Sakai (JP)

(72) Inventor: Sachin G. Deshpande, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 135 days.

(21) Appl. No.: 17/778,146

(22) PCT Filed: Nov. 18, 2020

(86) PCT No.: PCT/JP2020/042877
§ 371 (c)(1),
(2) Date: May 19, 2022

(87) PCT Pub. No.: WO2021/100724
PCT Pub. Date: May 27, 2021

(65) Prior Publication Data
US 2023/0026475 A1 Jan. 26, 2023

Related U.S. Application Data

(60) Provisional application No. 62/955,285, filed on Dec. 30, 2019, provisional application No. 62/938,603, filed on Nov. 21, 2019.

(51) Int. Cl.
*H04N 19/31* (2014.01)
*H04N 19/105* (2014.01)
(Continued)

(52) U.S. Cl.
CPC ........... *H04N 19/70* (2014.11); *H04N 19/105* (2014.11); *H04N 19/172* (2014.11)

(58) Field of Classification Search
CPC .... H04N 19/70; H04N 19/105; H04N 19/172; H04N 19/573
See application file for complete search history.

(56) References Cited

U.S. PATENT DOCUMENTS

2018/0316916 A1* 11/2018 Deshpande .......... H04N 19/105
2020/0374512 A1   11/2020 Paluri et al.

FOREIGN PATENT DOCUMENTS

EP          2830313 A1 *  1/2015 ........... H04N 19/105
WO   WO-2014004201 A1 *  1/2014 ........... H04N 19/102
(Continued)

OTHER PUBLICATIONS

Benjamin Bross, Versatile Video Coding (Draft 4), NET-MIO0I (Year: 2019).*

(Continued)

*Primary Examiner* — Philip P. Dang
(74) *Attorney, Agent, or Firm* — Keating & Bennett, LLP

(57) ABSTRACT

A video coding device may be configured to signal reference picture lists according to one or more of the techniques described herein. In one example, a method of decoding video data comprises: receiving reference picture list syntax elements; and parsing a syntax element specifying a value of a picture order count delta in the reference picture list syntax elements, wherein the syntax element is defined by i in a range of 0 to a number of entries in the reference picture list syntax elements, wherein: in case that a value i is not equal to zero, the picture order count delta is set to a value of the syntax element defined by i, wherein i is the number of entries in the reference picture list syntax elements, and in a case that a value i is equal to zero, the picture order count delta is set to a value of the syntax element plus one.

4 Claims, 6 Drawing Sheets

(51) Int. Cl.
*H04N 19/172* (2014.01)
*H04N 19/70* (2014.01)

(56) References Cited

FOREIGN PATENT DOCUMENTS

| WO | WO-2014006854 A1 * | 1/2014 | ........... H04N 19/105 |
| WO | WO-2014008136 A1 * | 1/2014 | ........... H04N 19/463 |
| WO | WO-2014052123 A1 * | 4/2014 | ........... H04N 19/503 |

OTHER PUBLICATIONS

ITU-T, Series H: Audiovisual and Multimedia Systems Infrastructure of audiovisual services—Coding of moving video Advanced video coding for generic audiovisual services, H.264 (Year: 2014).*
ITU-T, Series H: Audiovisual and Multimedia Systems Infrastructure of audiovisual services—Coding of moving video High efficiency video coding, H.265 (Year: 2016).*
Benjamin Bross, Versatile Video Coding (Draft 7), JVET-P2001 (Year: 2019).*
Official Communication issued in International Patent Application No. PCT/JP2020/042877, mailed on Jan. 26, 2021.
International Telecommunication Union, "Series H: Audiovisual and Multimedia Systems Infrastructure of audiovisual services—Coding of moving video, Advanced video coding for generic audiovisual services", ITU-T H.264, Aug. 2021, 842 pages.
International Telecommunication Union, "Series H: Audiovisual and Multimedia Systems Infrastructure of audiovisual services—Coding of moving video, High efficiency video coding", ITU-T H.265, Dec. 2016, 662 pages.
Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, Jul. 13-21, 2017, 51 pages.
Bross, "Working Draft 1 of Versatile Video Coding", Joint Video Experts Team (JVET) of ITU-T SG 16 WP 3 and ISO/IEC JTC 1/SC 29/WG 11, JVET-J1001-v2, Apr. 10-20, 2018, 39 pages.
Bross et al., "Versatile Video Coding (Draft 7)", Joint Video Experts Team (JVET) of ITU-T SG 16 WP 3 and ISO/IEC JTC 1/SC 29/WG 11, JVET-P2001-vE, Oct. 1-11, 2019, 491 pages.
Deshpande, "On Reference Picture List Information Signalling", Joint Video Experts Team (JVET) of ITU-T SG 16 WP 3 and ISO/IEC JTC 1/SC 29/WG 11, JVET-Q0217-v1, Jan. 7-17, 2020, pp. 1-12.
Deshpande, "On Reference Picture List and Inter-Layer Prediction", Joint Video Experts Team (JVET) of ITU-T SG 16 WP 3 and ISO/IEC JTC 1/SC 29/WG 11, JVET-P0182-v1, Oct. 1-11, 2019, pp. 1-10.

* cited by examiner

SYSTEMS AND METHODS FOR SIGNALING REFERENCE PICTURE LISTS IN VIDEO CODING

TECHNICAL FIELD

This disclosure relates to video coding and more particularly to techniques for signaling reference picture lists for coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate re-constructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10th Meeting of ISO/IEC JTC1/SC29/WG11 16-20 Apr. 2018, San Diego, CA From the multiple descriptions of video coding tools, a resulting initial draft text of a video coding specification is described in "Versatile Video Coding (Draft 1)," $10^{th}$ Meeting of ISO/IEC JTC1/SC29/WG11 16-20 Apr. 2018, San Diego, CA, document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 7)," 16th Meeting of ISO/IEC JTC1/SC29/WG11 1-11 Oct. 2019, Geneva, CH, document JVET-P2001-vE, which is incorporated by reference herein, and referred to as JVET-P2001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of decoding video data, the method comprising: receiving reference picture list syntax elements; and parsing a syntax element specifying a value of a picture order count delta in the reference picture list syntax elements, wherein the syntax element is defined by i in a range of 0 to a number of entries in the reference picture list syntax elements, wherein: in case that a value i is not equal to zero, the picture order count delta is set to a value of the syntax element defined by i, wherein i is the number of entries in the reference picture list syntax elements, and in a case that a value i is equal to zero, the picture order count delta is set to a value of the syntax element plus one.

In one example, a device of decoding video data, the device comprising: a processor configured to perform the following steps: receiving reference picture list syntax elements, and parsing a syntax element specifying a value of a picture order count delta in the reference picture list syntax elements, wherein the syntax element is defined by i in a range of 0 to a number of entries in the reference picture list syntax elements; and a memory associated with the processor, wherein: in case that a value i is not equal to zero, the picture order count delta is set to a value of the syntax element defined by i, wherein i is the number of entries in the reference picture list syntax elements, and in a case that a value i is equal to zero, the picture order count delta is set to a value of the syntax element plus one.

In one example, a method of encoding image data, the method comprising: signaling reference picture list syntax elements, wherein: the reference picture list syntax elements includes a syntax element specifying a value of a picture order count delta in the reference picture list syntax elements, wherein the syntax element is defined by i in a range of 0 to a number of entries in the reference picture list syntax elements, in case that a value i is not equal to zero, the picture order count delta is set to a value of the syntax element defined by i, wherein i is the number of entries in the reference picture list syntax elements, and in a case that a value i is equal to zero, the picture order count delta is set to a value of the syntax element plus one.

In one example, a device of encoding image data, the device comprising: a processor configured to signal reference picture list syntax elements, wherein: the reference picture list syntax elements includes a syntax element specifying a value of a picture order count delta in the reference picture list syntax elements, wherein the syntax element is defined by i in a range of 0 to a number of entries in the reference picture list syntax elements, in case that a value i is not equal to zero, the picture order count delta is set to a value of the syntax element defined by i, wherein i is the number of entries in the reference picture list syntax elements, and in a case that a value i is equal to zero, the picture order count delta is set to a value of the syntax element plus one.

The details of one or more examples are set forth in the accompanying drawings and the description below. Other features, objects, and advantages will be apparent from the description and drawings, and from the claims.

DESCRIPTION OF EMBODIMENTS

Figure 1:
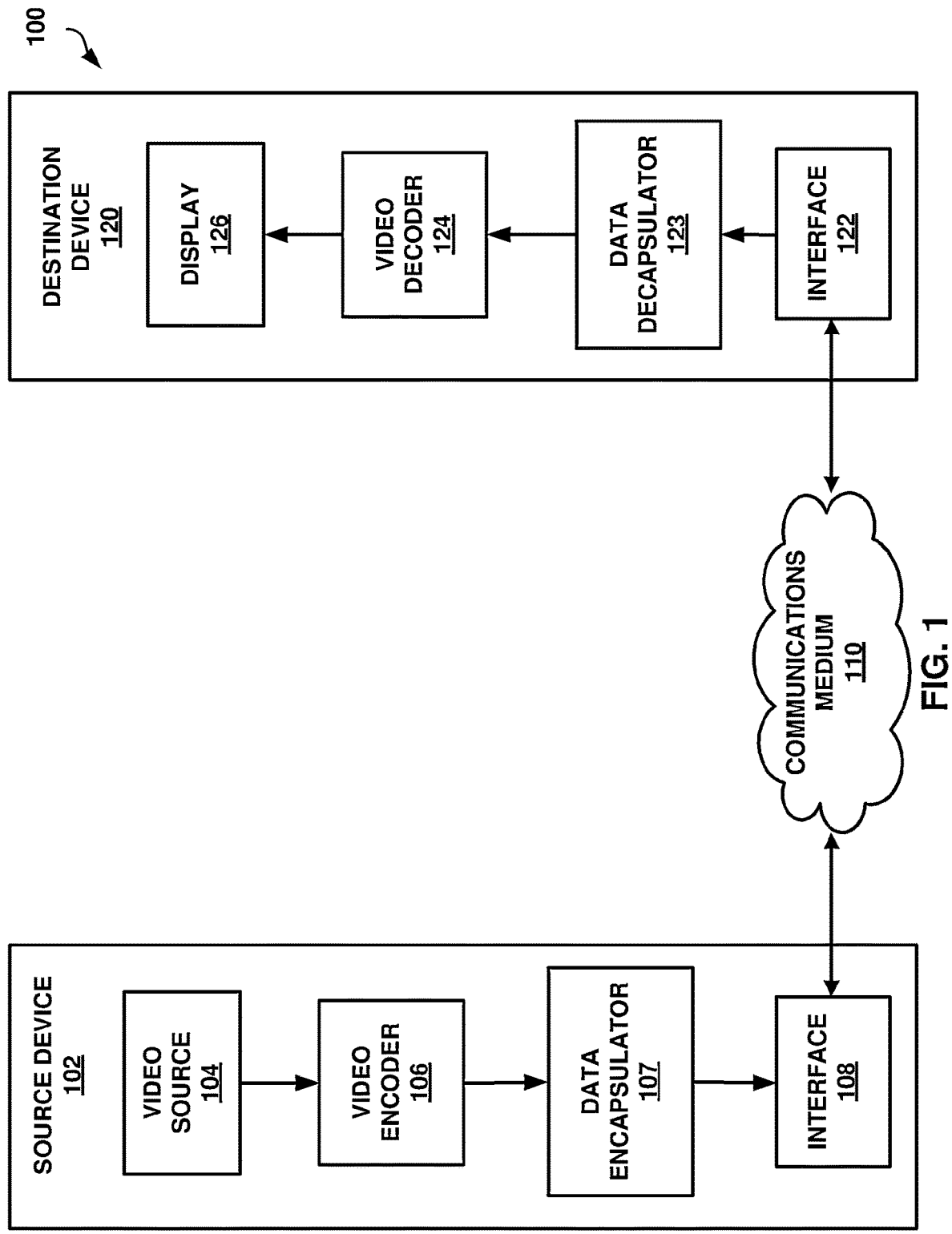
FIG. 1 is a block diagram illustrating an example of a system that may be configured to encode and decode video data according to one or more techniques of this disclosure.

In general, this disclosure describes various techniques for coding video data. In particular, this disclosure describes techniques for signaling reference picture lists for coded video data. It should be noted that although techniques of this disclosure are described with respect to ITU-T H.264, ITU-T H.265, JEM, and JVET-P2001, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-P2001. Thus, reference to ITU-T H.264, ITU-T H.265, JEM, and/or JVET-P2001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit structure having its root at the CU. In ITU-T H.265, prediction unit structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may be halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-P2001, CTUs are partitioned according a quadtree plus multi-type tree (QTMT or QT+MTT) structure. The QTMT in JVET-P2001 is similar to the QTBT in JEM. However, in JVET-P2001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

As described above, each video frame or picture may be divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to JVET-P2001, slices are required to consist of an integer number of complete tiles or an integer number of consecutive complete CTU rows within a tile, instead of only being required to consist of an integer number of CTUs. It should be noted that in JVET-P2001, the slice design does not include slice segments (i.e., no independent/dependent slice segments). Thus, in JVET-P2001, a picture may include a single tile, where the single tile is contained within a single slice or a picture may include multiple tiles where the multiple tiles (or CTU rows thereof) may be contained within one or more slices. In JVET-P2001, the partitioning of a picture into tiles is specified by specifying respective heights for tile rows and respective widths for tile columns. Thus, in JVET-P2001 a tile is a rectangular region of CTUs within a particular tile row and a particular tile column position. Further, it should be noted that JVET-P2001 provides where a picture may be partitioned into subpictures, where a subpicture is a rectangular region of a CTUs within a picture. The top-left CTU of a subpicture may be located at any CTU position within a picture with subpictures being constrained to include one or more slices Thus, unlike a tile, a subpicture is not necessarily limited to a particular row and column position. It should be noted that subpictures may be useful for encapsulating regions of interest within a picture and a subbitstream extraction process may be used to only decode and display a particular region of interest. That is, as described in further detail below, a bitstream of coded video data includes a sequence of network abstraction layer (NAL) units, where a NAL unit encapsulates coded video data, (i.e., video data corresponding to a slice of picture) or a NAL unit encapsulates metadata used for decoding video data (e.g., a parameter set) and a sub-bitstream extraction process forms a new bitstream by removing one or more NAL units from a bitstream.

Figure 2:
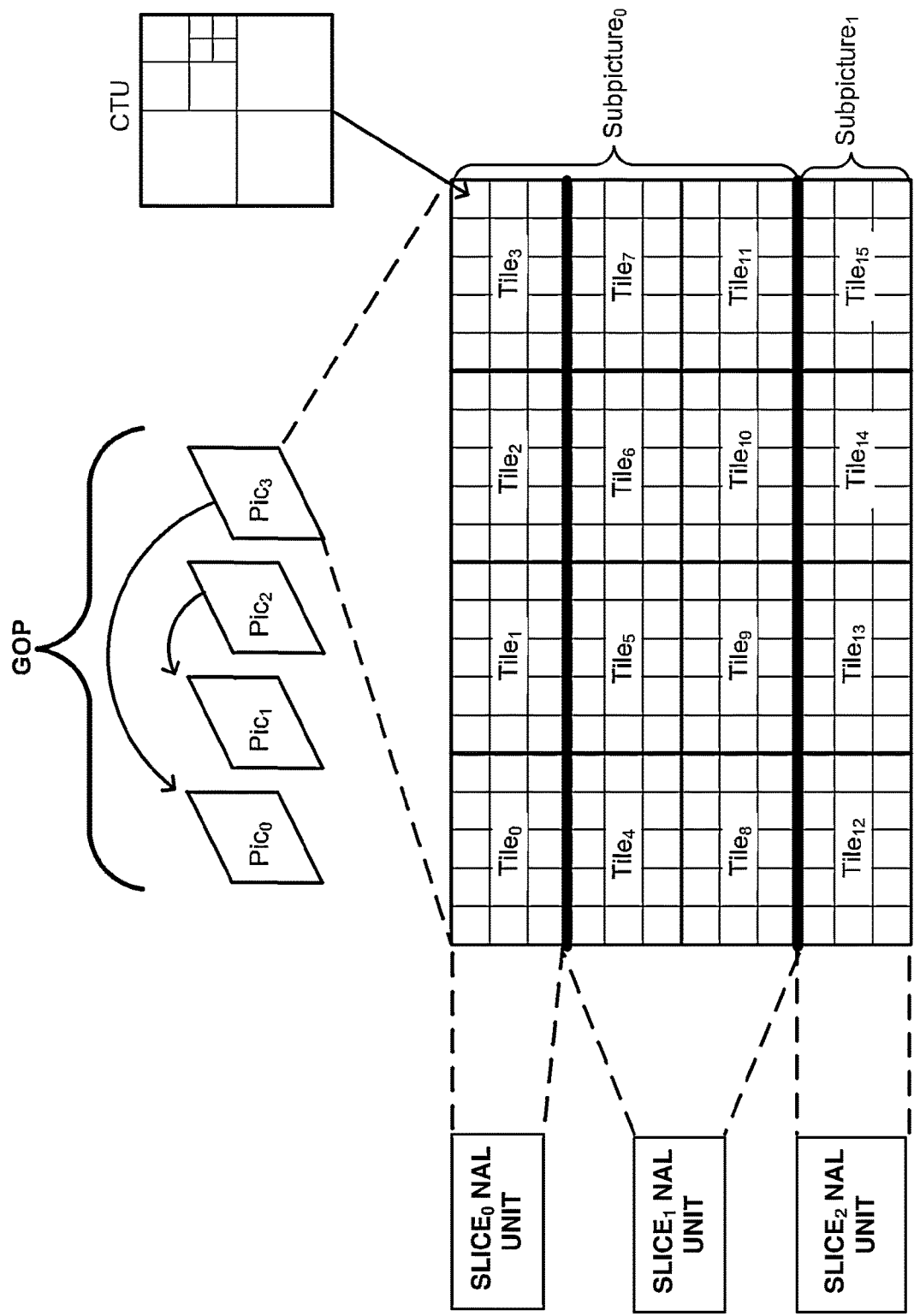
FIG. 2 is a conceptual diagram illustrating coded video data and corresponding data structures according to one or more techniques of this disclosure.

FIG. 2 is a conceptual diagram illustrating an example of a picture within a group of pictures partitioned according to tiles, slices, and subpictures. It should be noted that the techniques described herein may be applicable to tiles, slices, subpictures, subdivisions thereof and/or equivalent structures thereto. That is, the techniques described herein may be generally applicable regardless of how a picture is partitioned into regions. For example, in some cases, the techniques described herein may be applicable in cases where a tile may be partitioned into so-called bricks, where a brick is a rectangular region of CTU rows within a particular tile. Further, for example, in some cases, the techniques described herein may be applicable in cases where one or more tiles may be included in so-called tile groups, where a tile group includes an integer number of adjacent tiles. In the example illustrated in FIG. 2, $Pic_3$ is illustrated as including 16 tiles (i.e., $Tile_0$ to $Tile_{15}$) and three slices (i.e., $Slice_0$ to $Slice_2$). In the example illustrated in FIG. 2, $Slice_0$ includes four tiles (i.e., $Tile_0$ to $Tile_3$), $Slice_1$ includes eight tiles (i.e., $Tile_4$ to $Tile_{11}$), and $Slice_2$ includes four tiles (i.e., $Tile_{12}$ to $Tile_{15}$). Further, as illustrated in the example of FIG. 2, $Pic_3$ is illustrated as including two subpictures (i.e., $Subpicture_0$ and $Subpicture_1$), where $Subpicture_0$ includes $Slice_0$ and $Slice_1$ and where $Subpicture_1$ includes $Slice_2$. As described above, subpictures may be useful for encapsulating regions of interest within a picture and a sub-bitstream extraction process may be used in order to selectively decode (and display) a region interest. For example, referring to FIG. 2, $Subpicture_0$ may corresponding to an action portion of a sporting event presentation (e.g., a view of the field) and $Subpicture_1$ may corresponding to a scrolling banner displayed during the sporting event presentation. By using organizing a picture into subpictures in this manner, a viewer may be able to disable the display of the scrolling banner. That is, through a sub-bitstream extraction process $Slice_2$ NAL unit may be removed from a bitstream (and thus not decoded and/or displayed) and $Slice_0$ NAL unit and $Slice_r$ NAL unit may be decoded and displayed. The encapsulation of slices of a picture into respective NAL unit data structures and sub-bitstream extraction are described in further detail below.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, $Pic_2$ is illustrated as referencing $Pic_t$. Similarly, $Pic_3$ is illustrated as referencing $Pic_0$. With respect to FIG. 2, assuming the picture number corresponds to the decoding order, the DPB would be populated as follows: after decoding $Pic_0$, the DPB would include $\{Pic_0\}$; at the onset of decoding $Pic_t$, the DPB would include $\{Pic_0\}$; after decoding $Pic_t$, the DPB would include $\{Pic_0, Pic_1\}$; at the onset of decoding $Pic_2$, the DPB would include $\{Pic_0, Pic_1\}$. $Pic_2$ would then be decoded with reference to $Pic_t$ and after decoding $Pic_2$, the DPB would include $\{Pic_0, Pic_t, Pic_2\}$. At the onset of decoding $Pic_3$, pictures $Pic_0$ and $Pic_t$ would be marked for removal from the DPB, as they are not needed for decoding $Pic_3$ (or any subsequent pictures, not shown) and assuming $Pic_t$ and $Pic_2$ have been output, the DPB would be updated to include $\{Pic_0\}$. $Pic_3$ would then be decoded by referencing $Pic_0$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-P2001, a CU is associated with a transform tree structure having its root at the CU level. The transform tree is partitioned into one or more transform units (TUs). That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

With respect to the equations used herein, the following arithmetic operators may be used:
+ Addition
− Subtraction
\* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.

$$\frac{x}{y}$$

Used to denote division in mathematical equations where no truncation or rounding is intended.
Used to denote division in mathematical equations where no truncation or rounding is intended.
Further, the following mathematical functions may be used:
Log 2(x) the base-2 logarithm of x, $$\text{Min}(x, y) = \begin{cases} x; & x <= y \\ y; & x > y \end{cases};$$

$$\text{Max}(x, y) = \begin{cases} x; & x >= y \\ y; & x < y \end{cases}$$

Ceil(x) the smallest integer greater than or equal to x.
With respect to the example syntax used herein, the following definitions of logical operators may be applied:
x && y Boolean logical "and" of x and y
x||y Boolean logical "or" of x and y
! Boolean logical "not"
x ? y: z If x is TRUE or not equal to 0, evaluates to the value of y; otherwise, evaluates to the value of z.
Further, the following relational operators may be applied:
> Greater than
>= Greater than or equal to
< Less than
<= Less than or equal to
== Equal to
!= Not equal to Further, it should be noted that in the syntax descriptors used herein, the following descriptors may be applied:

b(8): byte having any pattern of bit string (8 bits). The parsing process for this descriptor is specified by the return value of the function read_bits(8).

f(n): fixed-pattern bit string using n bits written (from left to right) with the left bit first. The parsing process for this descriptor is specified by the return value of the function read_bits(n).

se(v): signed integer 0-th order Exp-Golomb-coded syntax element with the left bit first.

tb(v): truncated binary using up to maxVal bits with maxVal defined in the semantics of the syntax element.

tu(v): truncated unary using up to maxVal bits with maxVal defined in the semantics of the syntax element.

u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.

uc(v): unsigned integer 0-th order Exp-Golomb-coded syntax element with the left bit first.

As described above, video content includes video sequences comprised of a series of pictures and each picture may be divided into one or more regions. In JVET-P2001, a coded representation of a picture is referred to as a coded picture and all CTUs of the coded picture are encapsulated in one or more coded slice NAL units. That is, one or more corresponding coded slice NAL units encapsulate a coded representation of a picture. For example, referring again to FIG. 2, the coded representation of $Pic_3$ is encapsulated in three coded slice NAL units (i.e., $Slice_0$ NAL unit, $Slice_1$ NAL unit, and $Slice_2$ NAL unit). It should be noted that the term video coding layer (VCL) NAL unit is used as a collective term for coded slice NAL units, i.e., VCL NAL is a collective term which includes all types of slice NAL units. As described above, and in further detail below, a NAL unit may encapsulate metadata used for decoding video data. A NAL unit encapsulating metadata used for decoding a video sequence is generally referred to as a non-VCL NAL unit. Thus, in JVET-P2001, a NAL unit may be a VCL NAL unit or a non-VCL NAL unit. It should be noted that a VCL NAL unit includes slice header data, which provides information used for decoding the particular slice. Thus, in JVET-P2001, information used for decoding video data, which may be referred to as metadata in some cases, is not limited to being included in non-VCL NAL units. JVET-P2001 provides where a picture unit (PU) is a set of NAL units that contain all VCL NAL units of a coded picture and their associated non-VCL NAL units and where an access unit (AU) is a set of NAL units that are associated with each other according to a specified classification rule, are consecutive in decoding order, and contain exactly one coded picture for each present picture unit. A PU consists of one picture header NAL unit, one coded picture, which comprises of one or more VCL NAL units, and zero or more non-VCL NAL units. Thus, in JVET-P2001 an access unit includes one or more coded pictures. In some cases, an access unit may include pictures included in different layers of video. Layers of video are described in further detail below. Further, in JVET-P2001, a coded video sequence (CVS) is a sequence of AUs that consists, in decoding order, of a CVSS AU, followed by zero or more AUs that are not CVSS AUs, including all subsequent AUs up to but not including any subsequent AU that is a CVSS AU, where a coded video sequence start (CVSS) AU is an AU in which there is a picture unit for each layer in the CVS and the coded picture in each present picture unit is a coded layer video sequence start (CLVSS) picture. In JVET-P2001, a coded layer video sequence (CLVS) is a sequence of PUs within the same layer that consists, in decoding order, of a CLVSS PU, followed by zero or more PUs that are not CLVSS PUs, including all subsequent PUs up to but not including any subsequent PU that is a CLVSS PU. This is, in JVET-P2001, a bitstream may be described as including a sequence of NAL units forming a CVS, where a CVS includes AUs and each AU may include respective pictures for each of a plurality of layers for coded video.

Multi-layer video coding enables a video presentation to be decoded/displayed as a presentation corresponding to a base layer of video data and decoded/displayed one or more additional presentations corresponding to enhancement layers of video data. For example, a base layer may enable a video presentation having a basic level of quality (e.g., a High Definition rendering and/or a 30 Hz frame rate) to be presented and an enhancement layer may enable a video presentation having an enhanced level of quality (e.g., most Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. It should be noted that layers may also be coded independent of each other. In this case, there may not be inter-layer prediction between two layers. Each NAL unit may include an identifier indicating a layer of video data the NAL unit is associated with. As described above, a sub-bitstream extraction process may be used to only decode and display a particular region of interest of a picture. Further, a sub-bitstream extraction process may be used to only decode and display a particular layer of video. Sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation).

In JVET-P2001, each of a video sequence, a GOP, a picture, a slice, and CTU may be associated with metadata that describes video coding properties and some types of metadata an encapsulated in non-VCL NAL units. JVET-P2001 defines parameters sets that may be used to describe video data and/or video coding properties. In particular, JVET-P2001 includes the following five types of parameter sets: decoding parameter set (DPS), video parameter set (VPS), sequence parameter set (SPS), picture parameter set (PPS), and adaption parameter set (APS), where a SPS applies to apply to zero or more entire CVSs, a PPS applies to zero or more entire coded pictures, a APS applies to zero or more slices, and a DPS and a VPS may be optionally referenced by a SPS. A PPS applies to an individual coded picture that refers to it. In JVET-P2001, parameter sets may be encapsulated as a non-VCL NAL unit and/or may be signaled as a message. JVET-P2001 also includes a picture header (PH) which is encapsulated as a non-VCL NAL unit. In JVET-P2001, a picture header applies to all slices of a coded picture. JVET-P2001 further enables supplemental enhancement information (SEI) messages to be signaled. In JVET-P2001, SEI messages assist in processes related to decoding, display or other purposes, however, SEI messages may not be required for constructing the luma or chroma samples according to a decoding process. In JVET-P2001, SEI messages may be signaled in a bitstream using non-VCL NAL units. Further, SEI messages may be conveyed by some mechanism other than by being present in the bitstream (i.e., signaled out-of-band).

Figure 3:
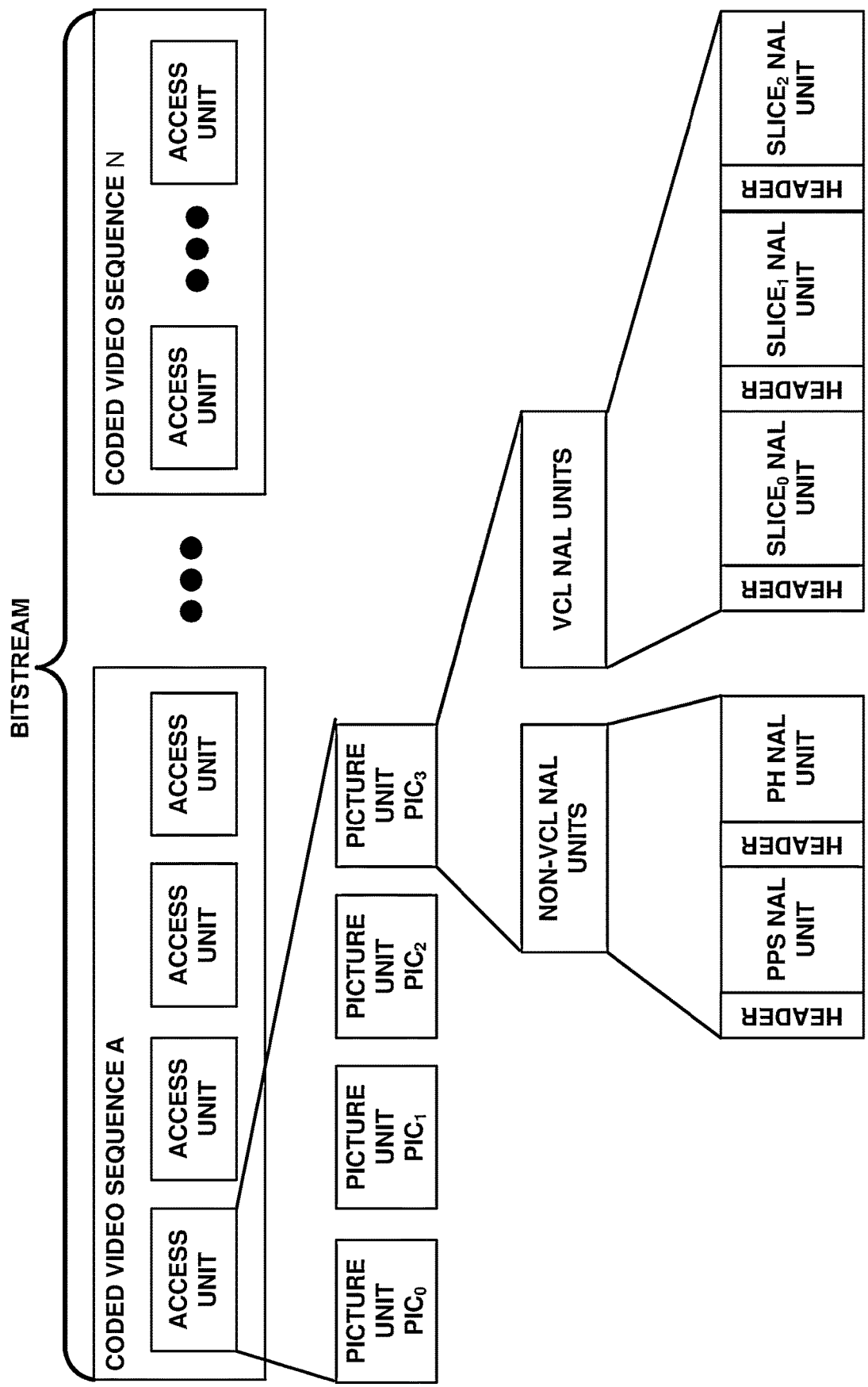
FIG. 3 is a conceptual diagram illustrating a data structure encapsulating coded video data and corresponding metadata according to one or more techniques of this disclosure.

FIG. 3 illustrates an example of a bitstream including multiple CVSs, where a CVS includes AUs, and AUs include picture units. The example illustrated in FIG. 3 corresponds to an example of encapsulating the slice NAL units illustrated in the example of FIG. 2 in a bitstream. In the example illustrated in FIG. 3, the corresponding picture unit for $Pic_3$ includes the three VCL NAL coded slice NAL units, i.e., $Slice_0$ NAL unit, $Slice_1$ NAL unit, and $Slice_2$ NAL unit and two non-VCL NAL units, i.e., a PPS NAL Unit and a PH NAL unit. It should be noted that in FIG. 3, HEADER is a NAL unit header (i.e., not to be confused with a slice header). Further, it should be noted that in FIG. 3, other non-VCL NAL units, which are not illustrated may be included in the CVSs, e.g., SPS NAL units, VPS NAL units, SEI message NAL units, etc. Further, it should be noted that in other examples, a PPS NAL Unit used for decoding $Pic_3$ may be included elsewhere in the bitstream, e.g., in the picture unit corresponding to $Pic_0$ or may be provided by an external mechanism. However, it should be note that in JVET-P2001, the picture header for each picture is required to be in the picture unit corresponding to the picture.

JVET-P2001 defines NAL unit header semantics that specify the type of Raw Byte Sequence Payload (RBSP) data structure included in the NAL unit. Table 1 illustrates the syntax of the NAL unit header provided in JVET-P2001.

TABLE 1

|  | Descriptor |
| --- | --- |
| nal_unit_header( ) { |  |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } |  |

JVET-P2001 provides the following definitions for the respective syntax elements illustrated in Table 1.
forbidden_zero_bit shall be equal to 0.
nuh_reserved_zero_bit shall be equal to '0'. The value 1 of nuh_reserved_zero_bit may be specified in the future by ITU-T|ISO/IEC. Decoders shall ignore (i.e. remove from the bitstream and discard) NAL units with nuh_reserved_zero_bit equal to '1'.
nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T|ISO/IEC.

The value of nuh_layer_id shall be the same for all VCL NAL units of a coded picture. The value of nuh_layer_id of a coded picture or a PU is the value of the nuh_layer_id of the VCL NAL units of the coded picture or the PU.

The value of nuh_layer_id for non-VCL NAL units is constrained as follows:
  If nal_unit_type is equal to PPS_NUT, PREFIX_APS_NUT, or SUFFIX_APS_NUT, nuh_layer_id shall be equal to the lowest nuh_layer_id value of the coded slice NAL units that refer to the NAL unit.
  Otherwise, if nal_unit_type is equal to SPS_NUT, nuh_layer_id shall be equal to the lowest nuh_layer_id value of the PPS NAL units that refer to the SPS NAL unit.
  Otherwise, if nal_unit_type is equal to AUD_NUT, nuh_layer_id shall be equal to vps_layer_id[0].
  Otherwise, when nal_unit_type is equal to PH_NUT, EOS_NUT, or FD_NUT, nuh_layer_id shall be equal to the nuh_layer_id of associated VCL NAL unit.
  NOTE—The value of nuh_layer_id of DPS, VPS, and EOB NAL units is not constrained.

The value of nal_unit_type shall be the same for all pictures of a CVSS AU.
nuh_temporal_id_plus1 minus 1 specifies a temporal identifier for the NAL unit.
The value of nuh_temporal_id_plus1 shall not be equal to 0.
The variable TemporalId is derived as follows:

TemporalId=nuh_temporal_id_plus1−1

When nal_unit_type is in the range of IDR_W_RADL to RSV_IRAP_12, inclusive, TemporalId shall be equal to 0. When nal_unit_type is equal to STSA_NUT, TemporalId shall not be equal to 0.
The value of TemporalId shall be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.
The value of TemporalId for non-VCL NAL units is constrained as follows:
  If nal_unit_type is equal to DPS_NUT, VPS_NUT, or SPS_NUT, TemporalId shall be equal to 0 and the TemporalId of the AU containing the NAL unit shall be equal to 0.
  Otherwise, if nal_unit_type is equal to PH_NUT, TemporalId shall be equal to the TemporalId of the PU containing the NAL unit.
  Otherwise, if nal_unit_type is equal to EOS_NUT or EOB_NUT, TemporalId shall be equal to 0.
  Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit.
  Otherwise, when nal_unit_type is equal to PPS_NUT, PREFIX_APS_NUT, or SUFFIX_APS_NUT, TemporalId shall be greater than or equal to the TemporalId of the PU containing the NAL unit.
NOTE—When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX_APS_NUT, or SUFFIX_APS_NUT, TemporalId may be greater than or equal to the TemporalId of the containing AU, as all PPSs and APSs may be included in the beginning of the bitstream (e.g., when they are transported out-of-band, and the receiver places them at the beginning of the bitstream), wherein the first coded picture has TemporalId equal to 0.
nal_unit_type specifies the NAL unit type, i.e., the type of RBSP data structure contained in the NAL unit as specified in Table 2.
NAL units that have nal_unit_type in the range of UNSPEC28 . . . UNSPEC31, inclusive, for which semantics are not specified, shall not affect the decoding process specified in this Specification.

NOTE—NAL unit types in the range of UNSPEC_28 ... UNSPEC_31 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the decoding units of the bitstream, decoders shall ignore (remove from the bitstream and discard) the contents of all NAL units that use reserved values of nal_unit_type.

NOTE—This requirement allows future definition of compatible extensions to this Specification.

TABLE 2

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 ... 6 | RSV_VCL_4 ... RSV_VCL_6 | Reserved non-IRAP VCL NAL unit types | VCL |
| 7 | IDR_W_RADL | Coded slice of an IDR picture slice_layer_rbsp( ) | VCL |
| 8 | IDR_N_LP | | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DPS_NUT | Decoding parameter set decoding_parameter_set_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 ... 31 | UNSPEC_28 ... UNSPEC_31 | Unspecified non-VCL NAL unit types | non-VCL |

NOTE -
A clean random access (CRA) picture may have associated RASL or RADL pictures present in the bitstream.
NOTE -
An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

For VCL NAL units of any particular picture, the following applies:

If mixed_nalu_types_in_pic_flag is equal to 0, the value of nal_unit_type shall be the same for all coded slice NAL units of a picture. A picture or a PU is referred to as having the same NAL unit type as the coded slice NAL units of the picture or PU.

Otherwise (mixed_nalu_types_in_pic_flag equal to 1), one or more of the VCL NAL units shall all have a particular value of nal_unit_type in the range of IDR_W_RADL to CRA_NUT, inclusive, and the other VCL NAL units shall all have a particular value of nal_unit_type in the range of TRAIL_NUT to RSV_VCL_6, inclusive, or equal to GRA_NUT.

For a single-layer bitstream, the following constraints apply:
  Each picture, other than the first picture in the bitstream in decoding order, is considered to be associated with the previous TRAP picture in decoding order.
  When a picture is a leading picture of an TRAP picture, it shall be a RADL or RASL picture.
  When a picture is a trailing picture of an TRAP picture, it shall not be a RADL or RASL picture.
  No RASL pictures shall be present in the bitstream that are associated with an IDR picture.
  No RADL pictures shall be present in the bitstream that are associated with an IDR picture having nal_unit_type equal to IDR_N_LP.
  NOTE—It is possible to perform random access at the position of an IRAP PU by discarding all PUs before the TRAP PU (and to correctly decode the IRAP picture and all the subsequent non-RASL pictures in decoding order) provided each parameter set is available (either in the bitstream or by external means not specified in this Specification) when it is referenced.
  Any picture that precedes an IRAP picture in decoding order shall precede the IRAP picture in output order and shall precede any RADL picture associated with the IRAP picture in output order.
  Any RASL picture associated with a CRA picture shall precede any RADL picture associated with the CRA picture in output order.
  Any RASL picture associated with a CRA picture shall follow, in output order, any IRAP picture that precedes the CRA picture in decoding order.
  If field_seq_flag is equal to 0 and the current picture is a leading picture associated with an IRAP picture, it shall precede, in decoding order, all non-leading pictures that are associated with the same IRAP picture. Otherwise, let picA and picB be the first and the last leading pictures, in decoding order, associated with an IRAP picture, respectively, there shall be at most one non-leading picture preceding picA in decoding order, and there shall be no non-leading picture between picA and picB in decoding order.

It should be noted that generally, an Intra Random Access Point (IRAP) picture is a picture that does not refer to any pictures other than itself for prediction in its decoding process. In JVET-P2001, an IRAP picture may be a clean random access (CRA) picture or an instantaneous decoder refresh (IDR) picture. In JVET-P2001, the first picture in the bitstream in decoding order must be an IRAP or a gradual decoding refresh (GDR) picture. JVET-P2001 describes the concept of a leading picture, which is a picture that precedes the associated IRAP picture in output order. JVET-P2001 further describes the concept of a trailing picture which is a non-IRAP picture that follows the associated IRAP picture in output order. Trailing pictures associated with an IRAP picture also follow the IRAP picture in decoding order. For IDR pictures, there are no trailing pictures that require reference to a picture decoded prior to the IDR picture. JVET-P2001 provides where a CRA picture may have leading pictures that follow the CRA picture in decoding order and contain inter picture prediction references to pictures decoded prior to the CRA picture. Thus, when the CRA picture is used as a random access point these leading pictures may not be decodable and are identified as random access skipped leading (RASL) pictures. The other type of picture that can follow an IRAP picture in decoding order and precede it in output order is the random access decodable leading (RADL) picture, which cannot contain references to any pictures that precede the IRAP picture in decoding order. A GDR picture, is a picture for which each VCL NAL unit has nal_unit_type equal to GDR_NUT. If the current picture is a GDR picture that is associated with a picture header which signals a syntax element receovery_poc_cnt and there is a picture picA that follows the current GDR picture in decoding order in the CLVS and that has PicOrderCntVal equal to the PicOrderCntVal of the current GDR picture plus the value of recovery_poc_cnt, the picture picA is referred to as the recovery point picture.

As provided in Table 2, a NAL unit may include a sequence parameter set syntax structure. As described above, previously decoded pictures may be organized into one or more reference pictures lists and identified using a reference picture index value. JVET-P2001 includes a ref_pic_list_struct( ) syntax structure for signaling a reference picture list. A ref_pic_list_struct( ) syntax structure may be present in a Sequence Parameter Set (SPS) or a slice header. Table 3 illustrates the relevant portion of the syntax structure of the SPS provided in JVET-P2001 including the ref_pic_list_struct( ) syntax structure.

TABLE 3

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sub_layers_minus1 ) | |
|   gdr_enabled_flag | u(1) |
|   sps_seq_parameter_set_id | u(4) |
|   chroma_format_idc | u(2) |
|   if( chroma_format_idc = = 3 ) | |
|     separate_colour_plane_flag | u(1) |
|   ref_pic_resampling_enabled_flag | u(1) |
| ... | |
|   log2_max_pic_order_cnt_lsb_minus4 | u(4) |
|   sps_poc_msb_flag | u(1) |
|   if( sps_poc_msb_flag ) | |
|     poc_msb_len_minus1 | ue(v) |
|   if( sps_max_sub_layers_minus1 > 0 ) | |
|     sps_sub_layer_dpb_params_flag | u(1) |
|   if( sps_ptl_dpb_hrd_params_present_flag ) | |
|     dpb_parameters( 0, sps_max_sub_layers_minus1, sps_sub_layer_dpb_params_flag ) | |
|   long_term_ref_pics_flag | u(1) |
|   inter_layer_ref_pics_present_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) | |
|       ref_pic_list_struct( i, j ) | |
|   } | |
| ... | |
| } | |

With respect to Table 3, JVET-P2001 provides the following semantics:

An SPS RBSP shall be available to the decoding process prior to it being referenced, included in at least one AU with TemporalId equal to 0 or provided through external means. All SPS NAL units with a particular value of sps_seq_parameter_set_id in a CVS shall have the same content.

sps_decoding_parameter_set_id, when greater than 0, specifies the value of dps_decoding_parameter_set_id for the DPS referred to by the SPS. When sps_decoding_parameter_set_id is equal to 0, the SPS does not refer to a DPS and no DPS is referred to when decoding each CLVS referring to the SPS. The value of sps_decoding_parameter_set_id shall be the same in all SPSs that are referred to by coded pictures in a bitstream.

sps_video_parameter_set_id, when greater than 0, specifies the value of vps_video_parameter_set_id for the VPS referred to by the SPS.

When sps_video_parameter_set_id is equal to 0, the following applies:
  The SPS does not refer to a VPS.
  No VPS is referred to when decoding each CLVS referring to the SPS.
  The value of vps_max_layers_minus1 is inferred to be equal to 0.
  The CVS shall contain only one layer (i.e., all VCL NAL unit in the CVS shall have the same value of nuh_layer_id).
  The value of GeneralLayerIdx[nuh_layer_id] is inferred to be equal to 0.
  The value of vps_independent_layer_flag[GeneralLayerIdx[nuh_layer_id]] is inferred to be equal to 1.

When vps_independent_layer_flag[GeneralLayerIdx[nuh_layer_id]] is equal to 1, the SPS referred to by a CLVS with a particular nuh_layer_id value nuhLayerId shall have nuh_layer_id equal to nuhLayerId.

sps_max_sub_layers_minus1 plus 1 specifies the maximum number of temporal sub-layers that may be present in each CLVS referring to the SPS. The value of sps_max_sub_layers_minus1 shall be in the range of 0 to vps_max_sub_layers_minus1, inclusive.

sps_reserved_zero_4 bits shall be equal to 0 in bitstreams conforming to this version of this Specification. Other values for sps_reserved_zero_4 bits are reserved for future use by ITU-T|ISO/IEC.

sps_ptl_dpb_hrd_params_present_flag equal to 1 specifies that a profile tier level( ) syntax structure and a dpb_parameters( ) syntax structure are present in the SPS, and a general_hrd_parameters( ) syntax structure and an ols_hrd_parameters( ) syntax structure may also be present in the SPS. sps_ptl_dpb_hrd_params_present_flag equal to 0 specifies that none of these syntax structures is present in the SPS. The value of sps_ptl_dpb_hrd_params_present_flag shall be equal to vps_independent_layer_flag[nuh_layer_id].

If vps_independent_layer_flag[GeneralLayerIdx[nuh_layer_id]] is equal equal to 1, the variable MaxDecPicBuffMinus1 is set equal to max_dec_pic_buffering_minus1[sps_max_sub_layers_minus1] in the dpb_parameters( ) syntax structure in the SPS. Otherwise, MaxDecPicBuffMinus1 is set equal to max_dec_pic_buffering_minus1[sps_max_sub_layers_minus1] in the layer_nonoutput_dpb_params_idx[GeneralLayerIdx[nuh_layer_id]]-th dpb_parameters( ) syntax structure in the VPS.

gdr_enabled_flag equal to 1 specifies that GDR pictures may be present in CLVSs referring to the SPS. gdr_enabled_flag equal to 0 specifies that GDR pictures are not present in CLVSs referring to the SPS.

sps_seq_parameter_set_id provides an identifier for the SPS for reference by other syntax elements. SPS NAL units, regardless of the nuh_layer_id values, share the same value space of sps_seq_parameter_set_id.

chroma_format_idc specifies the chroma sampling relative to the luma sampling.

separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

NOTE—There is no dependency in decoding processes between the colour planes having different colour_plane_id values. For example, the decoding process of a monochrome picture with one value of colour_plane_id does not use any data from monochrome pictures having different values of colour_plane_id for inter prediction.

Depending on the value of separate_colour_plane_flag, the value of the variable ChromaArrayType is assigned as follows:
  If separate_colour_plane_flag is equal to 0, ChromaArrayType is set equal to chroma_format_idc.
  Otherwise (separate_colour_plane_flag is equal to 1), ChromaArrayType is set equal to 0.

ref_pic_resampling_enabled_flag equal to 1 specifies that reference picture resampling may be applied when decoding coded pictures in the CLVSs referring to the SPS. ref_pic_resampling_enabled_flag equal to 0 specifies that reference picture resampling is not applied when decoding pictures in CLVSs referring to the SPS.

log 2_max_pic_order_cnt_lsb_minus4 specifies the value of the variable MaxPicOrderCntLsb that is used in the decoding process for picture order count as follows:

$$MaxPicOrderCntLsb = 2^{(log\ 2\_max\_pic\_order\_cnt\_lsb\_minus\ 4-4)}$$

The value of log 2_max_pic_order_cnt_lsb_minus4 shall be in the range of 0 to 12, inclusive.

sps_poc_msb_flag equal to 1 specifies that the ph_poc_msb_cycle_present_flag syntax element is present in PHs referring to the SPS. sps_poc_msb_flag equal to 0 specifies that the ph_poc_msb_cycle_present_flag syntax element is not present in PHs referring to the SPS.

poc_msb_len_minus1 plus 1 specifies the length, in bits, of the poc_msb_val syntax elements, when present in the PHs referring to the SPS. The value of poc_msb_len_minus1 shall be in the range of 0 to 32-log 2_max_pic_order_ent_lsb_minus4-5, inclusive.

sps_sub_layer_dpb_params_flag is used to control the presence of max_dec_pic_buffering_minus1[i], max_num_reorder_pics[i], and max_latency_increase_plus1[i] syntax elements in the dpb_parameters( ) syntax structure in the SPS. When not present, the value of sps_sub_dpb_params_info_present_flag is inferred to be equal to 0.

long_term_ref_pics_flag equal to 0 specifies that no LTRP is used for inter prediction of any coded picture in the CLVS. long_term_ref_pics_flag equal to 1 specifies that LTRPs may be used for inter prediction of one or more coded pictures in the CLVS.

inter_layer_ref_pics_present_flag equal to 0 specifies that no ILRP is used for inter prediction of any coded picture in the CLVS. inter_layer_ref_pics_flag equal to 1 specifies that ILRPs may be used for inter prediction of one or more coded pictures in the CLVS. When sps_video_parameter_set_id is equal to 0, the value of inter_layer_ref_pics_present_flag is inferred to be equal to 0. When vps_independent_layer_flag[GeneralLayerIdx[nuh_layer_id]] is equal to 1, the value of inter_layer_ref_pics_present_flag shall be equal to 0.

sps_idr_rpl_present_flag equal to 1 specifies that reference picture list syntax elements are present in slice headers of IDR pictures. sps_idr_rpl_present_flag equal to 0 specifies that reference picture list syntax elements are not present in slice headers of IDR pictures.

rpl1_same_as_rpl0_flag equal to 1 specifies that the syntax element num_ref_pic_lists_in_sps[1] and the syntax structure ref_pic_list_struct(1, rplsIdx) are not present and the following applies:

The value of num_ref_pic_lists_in_sps[1] is inferred to be equal to the value of num_ref_pic_lists_in_sps[0].

The value of each of syntax elements in ref_pic_list_struct(1, rplsIdx) is inferred to be equal to the value of corresponding syntax element in ref_pic_list_struct (0, rplsIdx) for rplsIdx ranging from 0 to num_ref_pic_lists_in_sps[0]−1.

num_ref_pic_lists_in_sps[i] specifies the number of the ref_pic_list_struct(listIdx, rplsIdx) syntax structures with listIdx equal to i included in the SPS. The value of num_ref_pic_lists_in_sps[i] shall be in the range of 0 to 64, inclusive.

NOTE—For each value of listIdx (equal to 0 or 1), a decoder should allocate memory for a total number of num_ref_pic_lists_in_sps[i]+1 ref_pic_list_struct(listIdx, rplsIdx) syntax structures since there may be one ref_pic_list_struct(listIdx, rplsIdx) syntax structure directly signalled in the slice headers of a current picture.

Table 4 illustrates the syntax of the ref_pic_list_struct( ) as provided in JVET-P2001.

TABLE 4

| | Descriptor |
|---|---|
| ref_pic_list_struct( listIdx, rplsIdx ) { | |
|   num_ref_entries[ listIdx ][ rplsIdx ] | ue(v) |
|   if( long_term_ref_pics_flag ) | |
|     ltrp_in_slice_header_flag[ listIdx ][ rplsIdx ] | u(1) |
|   for( i = 0, j = 0; i < num_ref_entries[ listIdx ][ rplsIdx ]; i++) { | |
|     if( inter_layer_ref_pics_present_flag ) | |
|       inter_layer_ref_pic_flag[ listIdx ][ rplsIdx ][ i ] | u(1) |
|     if( !inter_layer_ref_pics_flag[ listIdx ][ rplsIdx ][ i ] ) { | |
|       if( long_term_ref_pics_flag ) | |
|         st_ref_pic_flag[ listIdx ][ rplsIdx ][ i ] | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } else if( | |
|       !ltrp_in_slice_header_flag[ listIdx ][ rplsIdx ] ) | |
|         rpls_poc_lsb_lt[ listIdx ][ rplsIdx ][ j++ ] | u(v) |
|     } else | |
|       ilrp_idx[ listIdx ][ rplsIdx ][ i ] | ue(v) |
|   } | |
| } | |

With respect to Table 4, JVET-P2001 provides the following semantics:

The ref_pic_list_struct(listIdx, rplsIdx) syntax structure may be present in an SPS or in a slice header. Depending on whether the syntax structure is included in a slice header or an SPS, the following applies:

If present in a slice header, the ref_pic_list_struct(listIdx, rplsIdx) syntax structure specifies reference picture list listIdx of the current picture (the picture containing the slice).

Otherwise (present in an SPS), the ref_pic_list_struct (listIdx, rplsIdx) syntax structure specifies a candidate for reference picture list listIdx, and the term "the current picture" in the semantics specified in the remainder of this clause refers to each picture that 1) has one or more slices containing ref_pic_list_idx[listIdx] equal to an index into the list of the ref_pic_list_struct(listIdx, rplsIdx) syntax structures included in the SPS, and 2) is in a CVS that refers to the SPS.

num_ref_entries[listIdx][rplsIdx] specifies the number of entries in the ref_pic_list_struct(listIdx, rplsIdx) syntax structure. The value of num_ref_entries[listIdx][rplsIdx] shall be in the range of 0 to MaxDecPicBuffMinus1+14, inclusive.

ltrp_in_slice_header_flag[listIdx][rplsIdx] equal to 0 specifies that the POC LSBs of the LTRP entries in the ref_pic_list_struct(listIdx, rplsIdx) syntax structure are present in the ref_pic_list_struct(listIdx, rplsIdx) syntax structure. ltrp_in_slice_header_flag[listIdx][rplsIdx] equal to 1 specifies that the POC LSBs of the LTRP entries in the ref_pic_list_struct(listIdx, rplsIdx) syntax structure are not present in the ref_pic_list_struct(listIdx, rplsIdx) syntax structure.

inter_layer_ref_pic_flag[listIdx][rplsIdx][i] equal to 1 specifies that the i-th entry in the ref_pic_list_struct(listIdx, rplsIdx) syntax structure is an ILRP entry. inter_layer_ref_pic_flag[listIdx][rplsIdx][i] equal to 0 specifies that the i-th entry in the ref_pic_list_struct(listIdx, rplsIdx) syntax structure is not an ILRP entry. When not present, the value of inter_layer_ref_pic_flag[listIdx][rplsIdx][i] is inferred to be equal to 0.

st_ref_pic_flag[listIdx][rplsIdx][i] equal to 1 specifies that the i-th entry in the ref_pic_list_struct(listIdx, rplsIdx) syntax structure is an STRP entry. st_ref_pic_flag[listIdx][rplsIdx][i] equal to 0 specifies that the i-th entry in the ref_pic_list_struct(listIdx, rplsIdx) syntax structure is an LTRP entry. When inter_layer_ref_pic_flag[listIdx][rplsIdx][i] is equal to 0 and st_ref_pic_flag[listIdx][rplsIdx][i] is not present, the value of st_ref_pic_flag[listIdx][rplsIdx][i] is inferred to be equal to 1.

The variable NumLtrpEntries[listIdx][rplsIdx] is derived as follows:

```
for( i = 0, NumLtrpEntries[ listIdx ][ rplsIdx ] = 0;
     i < num_ref_entries[ listIdx ][ rplsIdx ]; i++ )
  if(!inter_layer_ref_pic_flag[ listIdx ][ rplsIdx ][ i ] &&
     !st_ref_pic_flag[ listIdx ][ rplsIdx ][ i ] )
    NumLtrpEntries[ listIdx ][ rplsIdx ]++
``` abs_delta_poc_st[listIdx][rplsIdx][i] specifies the value of the variable AbsDeltaPocSt[listIdx][rplsIdx][i] as follows:

```
if( sps_weighted_pred_flag | | sps_weighted_bipred_flag )
  AbsDeltaPocSt[ listIdx ][ rplsIdx ][ i ] =
    abs_delta_poc_st[ listIdx ][ rplsIdx ][ i ]
else
  AbsDeltaPocSt[ listIdx ][ rplsIdx ][ i ] =
    abs_delta_poc_st[ listIdx ][ rplsIdx ][ i ] + 1
```

The value of abs_delta_poc_st[listIdx][rplsIdx][i] shall be in the range of 0 to $2^{15}-1$, inclusive.

strp_entry_sign_flag[listIdx][rplsIdx][i] equal to 1 specifies that i-th entry in the syntax structure ref_pic_list_struct (listIdx, rplsIdx) has a value greater than or equal to 0. strp_entry_sign_flag[listIdx][rplsIdx][i] equal to 0 specifies that the i-th entry in the syntax structure ref_pic_list_struct (listIdx, rplsIdx) has a value less than 0. When not present, the value of strp_entry_sign_flag[listIdx][rplsIdx][i] is inferred to be equal to 1. The list DeltaPocValSt[listIdx] [rplsIdx] is derived as follows:

```
for( i = 0; i < num_ref_entries[ listIdx ][ rplsIdx ]; i++ )
   if( !inter_layer_ref_pic_flag[ listIdx ][ rplsIdx ][ i ] &&
      st_ref_pic_flag[ listIdx ][ rplsIdx ][ i ] )
         DeltaPocValSt[ listIdx ][ rplsIdx ][ i ] =
         ( strp_entry_sign_flag[ listIdx ][ rplsIdx ][ i ] ) ?
            AbsDeltaPocSt[ listIdx ][ rplsIdx ][ i ] :
            0 − AbsDeltaPocSt[ listIdx ][ rplsIdx ][ i ]
``` rpls_poc_lsb_lt[listIdx][rplsIdx][i] specifies the value of the picture order count modulo MaxPicOrderCntLsb of the picture referred to by the i-th entry in the ref_pic_list_struct (listIdx, rplsIdx) syntax structure. The length of the rpls_poc_lsb_lt[listIdx][rplsIdx][i] syntax element is log 2_max_pic_order_cnt_lsb_minus4+4 bits.

ilrp_idx[listIdx][rplsIdx][i] specifies the index, to the list of the direct reference layers, of the ILRP of the i-th entry in the ref_pic_list_struct(listIdx rplsIdx) syntax structure. The value of ilrp_idx[listIdx][rplsIdx][i] shall be in the range of 0 to NumDirectRefLayers[GeneralLayerIdx[nuh_layer_id]]−1, inclusive.

As provided in Table 2, a NAL unit may include a picture parameter set syntax structure. As further described above, a ref_pic_list_struct( ) syntax structure may be present in SPS or a slice header. A picture parameter set syntax structure indicates whether a ref_pic_list_struct( ) syntax structure is in a slice header. Table 5 illustrates the relevant portion of the syntax structure of the PPS provided in JVET-P2001 indicating whether a ref_pic_list_struct( ) syntax structure is present in a slice header.

All PPS NAL units with a particular value of pps_pic_parameter_set_id within a PU shall have the same content.

pps_pic_parameter_set_id identifies the PPS for reference by other syntax elements. The value of pps_pic_parameter_set_id shall be in the range of 0 to 63. inclusive.

PPS NAL units, regardless of the nuh_layer_id values, share the same value space of pps_pic_parameter_set_id.

pps_seq_parameter_set_id specifies the value of sps_seq_parameter_set_id for the SPS. The value of pps_seq_parameter_set_id shall be in the range of 0 to 15, inclusive. The value of pps_seq_parameter_set_id shall be the same in all PPSs that are referred to by coded pictures in a CLVS.

output_flag_present_flag equal to 1 indicates that the pic_output_flag syntax element is present in slice headers referring to the PPS. output_flag_present_flag equal to 0 indicates that the pic_output_flag syntax element is not present in slice headers referring to the PPS.

mixed_nalu_types_in_pic_flag equal to 1 specifies that each picture referring to the PPS has more than one VCL NAL unit and that the VAL NAL units do not have the same value of nal_unit_type and that the picture is not an IRAP picture. mixed_nalu_types_in_pic_flag equal to 0 specifies that each picture referring to the PPS has one or more VCL NAL units and the VCL NAL units of each picture referring to the PPS have the same value of nal_unit_type.

When no_mixed_nalu_types_in_pic_constraint_flag is equal to 1, the value of mixed_nalu_types_in_pic_flag shall be equal to 0.

TABLE 5

| | Descriptor |
|---|---|
| pic_parameter_set_rbsp( ) { | |
|   pps_pic_parameter_set_id | ue(v) |
|   pps_seq_parameter_set_id | u(4) |
|   ... | |
|   output_flag_present_flag | u(1) |
|   mixed_nalu_types_in_pic_flag | u(1) |
|   ... | |
|   for( i = 0; i < 2; i++ ) | |
|     num_ref_idx_default_active_minus1[ i ] | ue(v) |
|   rpl1_idx_present_flag | u(1) |
|   init_qp_minus26 | se(v) |
|   ... | |
|   constant_slice_header_params_enabled_flag | u(1) |
|   if( constant_slice_header_params_enabled_flag ) { | |
|     pps_dep_quant_enabled_idc | u(2) |
|     for( i = 0; i < 2; i++ ) | |
|       pps_ref_pic_list_sps_idc[ i ] | u(2) |
|     pps_mvd_l1_zero_idc | u(2) |
|     pps_collocated_from_l0_idc | u(2) |
|     pps_six_minus_max_num_merge_cand_plus1 | ue(v) |
|     pps_max_num_merge_cand_minus_max_num_triangle_cand_plus1 | ue(v) |
|   } | |
|   picture_header_extension_present_flag | u(1) |
|   slice_header_extension_present_flag | u(1) |
|   pps_extension_flag | u(1) |
|   if( pps_extension_flag ) | |
|     while( more_rbsp_data( ) ) | |
|       pps_extension_data_flag | u(1) |
|   rbsp_trailing_bits( ) | |
| } | |

With respect to Table 5, JVET-P2001 provides the following semantics:

A PPS RBSP shall be available to the decoding process prior to it being referenced, included in at least one AU with TemporalId less than or equal to the TemporalId of the PPS NAL unit or provided through external means.

For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:

The slice shall belong to a subpicture subpicA for which the value of the corresponding sub_pic_treated_as_pic_flag[i] is equal to 1.

The slice shall not belong to a subpicture of picA containing VCL NAL units with nal_unit_type not equal to nalUnitTypeA.

For all the following PUs in the CLVS in decoding order, neither RefPicList[0] nor RefPicList[1] of a slice in subpicA shall include any picture preceding picA in decoding order in an active entry.

num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] shall be in the range of 0 to 14, inclusive.

rpl1_idx_present_flag equal to 0 specifies that ref_pic_list_sps_flag[1] and ref_pic_list_idx[1] are not present in slice headers. rpl1_idx_present_flag equal to 1 specifies that ref_pic_list_sps_flag[1] and ref_pic_list_idx[1] may be present in slice headers.

init_qp_minus26 plus 26 specifies the initial value of $SliceQp_Y$ for each slice referring to the PPS. The initial value of $SliceQp_Y$ is modified at the slice layer when a non-zero value of slice_qp_delta is decoded. The value of init_qp_minus26 shall be in the range of −(26+QpBdOffset) to +37, inclusive.

constant_slice_header_params_enabled_flag equal to 0 specifies that pps_dep_quant_enabled_idc, pps_ref_pic_list_sps_idc[i], pps_mvd_l1_zero_idc, pps_collocated_from_l0_idc, pps_six_minus_max_num_merge_cand_plus1, and pps_max_num_merge_cand_minus_max_num_triangle_cand_plus1 are inferred to be equal to 0. constant_slice_header_params_enabled_flag equal to 1 specifies that these syntax elements are present in the PPS.

pps_dep_quant_enabled_idc equal to 0 specifies that the syntax element pic_dep_quant_enabled_flag is present in PHs referring to the PPS. pps_dep_quant_enabled_idc equal to 1 or 2 specifies that the syntax element pic_dep_quant_enabled_flag is not present in PHs referring to the PPS. pps_dep_quant_enabled_idc equal to 3 is reserved for future use by ITU-T|ISO/IEC.

pps_ref_pic_list_sps_idc[i] equal to 0 specifies that the syntax element pic_rpl_sps_flag[i] is present in PHs referring to the PPS or slice_rpl_sps_flag[i] is present in slice header referring to the PPS. pps_ref_pic_list_sps_idc[i] equal to 1 or 2 specifies that the syntax element pic_rpl_sps_flag[i] is not present in PHs referring to the PPS and slice_rpl_sps_flag[i] is not present in slice header referring to the PPS. pps_ref_pic_list_sps_idc[i] equal to 3 is reserved for future use by ITU-T|ISO/IEC.

pps_mvd_l1_zero_idc equal to 0 specifies that the syntax element mvd_l1_zero_flag is present in PHs referring to the PPS. pps_mvd_l1_zero_idc equal to 1 or 2 specifies that mvd_l1_zero_flag is not present in PHs referring to the PPS. pps_mvd_l1_zero_idc equal to 3 is reserved for future use by ITU-T|ISO/IEC.

pps_collocated_from_l0_idc equal to 0 specifies that the syntax element collocated_from_l0_flag is present in slice header of slices referring to the PPS. pps_collocated_from_l0_idc equal to 1 or 2 specifies that the syntax element collocated_from_l0_flag is not present in slice header of slices referring to the PPS. pps_collocated_from_l0_idc equal to 3 is reserved for future use by ITU-T|ISO/IEC.

pps_six_minus_max_num_merge_cand_plus1 equal to 0 specifies that pic_six_minus_max_num_merge_cand is present in PHs referring to the PPS. pps_six_minus_max_num_merge_cand_plus1 greater than 0 specifies that pic_six_minus_max_num_merge_cand is not present in PHs referring to the PPS. The value of pps_six_minus_max_num_merge_cand_plus1 shall be in the range of 0 to 6, inclusive.

pps_max_num_merge_cand_minus_max_num_triangle_cand_plus1 equal to 0 specifies that pic_max_num_merge_cand_minus_max_num_triangle_cand is present in PHs of slices referring to the PPS. pps_max_num_merge_cand_minus_max_num_triangle_cand_plus1 greater than 0 specifies that pic_max_num_merge_cand_minus_max_num_triangle_cand is not present in PHs referring to the PPS. The value of pps_max_num_merge_cand_minus_max_num_triangle_cand_plus1 shall be in the range of 0 to MaxNumMergeCand−1.

picture_header_extension_present_flag equal to 0 specifies that no PH extension syntax elements are present in PHs referring to the PPS. picture_header_extension_present_flag equal to 1 specifies that PH extension syntax elements are present in PHs referring to the PPS. picture_header_extension_present_flag shall be equal to 0 in bitstreams conforming to this version of this Specification.

slice_header_extension_present_flag equal to 0 specifies that no slice header extension syntax elements are present in the slice headers for coded pictures referring to the PPS. slice_header_extension_present_flag equal to 1 specifies that slice header extension syntax elements are present in the slice headers for coded pictures referring to the PPS. slice_header_extension_present_flag shall be equal to 0 in bitstreams conforming to this version of this Specification.

pps_extension_flag equal to 0 specifies that no pps_extension_data_flag syntax elements are present in the PPS RBSP syntax structure. pps_extension_flag equal to 1 specifies that there are pps_extension_data_flag syntax elements present in the PPS RBSP syntax structure.

pps_extension_data_flag may have any value. Its presence and value do not affect decoder conformance to profiles specified in this version of this Specification. Decoders conforming to this version of this Specification shall ignore all pps_extension_data_flag syntax elements.

As provided in Table 2, a NAL unit may include a picture header syntax structure. A picture header syntax structure indicates an index of a ref_pic_list_struct( ) used for a current picture. Table 6 illustrates the relevant portion of the syntax structure of the picture header provided in JVET-P2001.

TABLE 6

| | Descriptor |
|---|---|
| picture_header_rbsp( ) { | |
|   non_reference_picture_flag | u(1) |
|   gdr_pic_flag | u(1) |

TABLE 6-continued

| | Descriptor |
|---|---|
| no_output_of_prior_pics_flag | u(1) |
| if( gdr_pic_flag ) | |
|   recovery_poc_cnt | ue(v) |
| ph_pic_parameter_set_id | ue(v) |
| if( sps_poc_msb_flag ) { | |
|   ph_poc_msb_present_flag | u(1) |
|   if( ph_poc_msb_present_flag ) | |
|     poc_msb_val | u(v) |
| } | |
| ... | |
| if( output_flag_present_flag ) | |
|   pic_output_flag | u(1) |
| pic_rpl_present_flag | u(1) |
| if( pic_rpl_present_flag ) { | |
|   for( i = 0; i < 2; i++ ) { | |
|     if( num_ref_pic_lists_in_sps[ i ] > 0 && !pps_ref_pic_list_sps_idc[ i ] && | |
|       ( i = = 0 || ( i = = 1 && rpl1_idx_present_flag ) ) ) | |
|       pic_rpl_sps_flag[ i ] | u(1) |
|     if( pic_rpl_sps_flag[ i ] ) { | |
|       if( num_ref_pic_lists_in_sps[ i ] > 1 && | |
|         ( i = = 0 || ( i = = 1 && rpl1_idx_present_flag ) ) ) | |
|         pic_rpl_idx[ i ] | u(v) |
|     } else | |
|       ref_pic_list_struct( i, num_ref_pic_lists_in_sps[ i ] ) | |
|     for( j = 0; j < NumLtrpEntries[ i ][ RplsIdx[ i ] ]; j++ ) { | |
|       if( ltrp_in_slice_header_flag[ i ][ RplsIdx[ i ] ] ) | |
|         pic_poc_lsb_lt[ i ][ j ] | u(v) |
|       pic_delta_poc_msb_present_flag[ i ][ j ] | u(1) |
|       if( pic_delta_poc_msb_present_flag[ i ][ j ] ) | |
|         pic_delta_poc_msb_cycle_lt[ i ][ j ] | ue(v) |
|     } | |
|   } | |
| } | |
| ... | |
| } | |

With respect to Table 6, JVET-P2001 provides the following semantics:

The PH contains information that is common for all slices of the coded picture associated with the PH.

non_reference_picture_flag equal to 1 specifies the picture associated with the PH is never used as a reference picture. non_reference_picture_flag equal to 0 specifies the picture associated with the PH may or may not be used as a reference picture.

gdr_pic_flag equal to 1 specifies the picture associated with the PH is a GDR picture. gdr_pic_flag equal to 0 specifies that the picture associated with the PH is not a GDR picture.

no_output_of_prior_pics_flag affects the output of previously-decoded pictures in the DPB after the decoding of a CLVSS picture that is not the first picture in the bitstream as specified.

recovery_poc_cnt specifies the recovery point of decoded pictures in output order. If the current picture is a GDR picture that is associated with the PH and there is a picture picA that follows the current GDR picture in decoding order in the CLVS and that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb−1, inclusive.

NOTE—When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

ph_pic_parameter_set_id specifies the value of pps_pic_parameter_set_id for the PPS in use. The value of ph_pic_parameter_set_id shall be in the range of 0 to 63, inclusive.

It is a requirement of bitstream conformance that the value of TemporalId of the PH shall be greater than or equal to the value of TemporalId of the PPS that has pps_pic_parameter_set_id equal to ph_pic_parameter_set_id.

ph_poc_msb_present_flag equal to 1 specifies that the syntax element poc_msb_val is present in the PH. ph_poc_msb_present_flag equal to 0 specifies that the syntax element poc_msb_val is not present in the PH. When vps_independent_layer_flag[GeneralLayerIdx[nuh_layer_id]] is equal to 0 and there is a picture in the current AU in a reference layer of the current layer, the value of ph_poc_msb_present_flag shall be equal to 0.

poc_msb_val specifies the POC MSB value of the current picture. The length of the syntax element poc_msb_val is poc_msb_len_minus1+1 bits.

pic_output_flag affects the decoded picture output and removal processes as specified. When pic_output_flag is not present, it is inferred to be equal to 1.

pic_rpl_present_flag equals 1 specifies that reference picture list signalling is present in the PH. pic_rpl_present_flag equals 0 specifies that reference picture list signalling is not present in the PH and may be present in slice headers of slices of the picture.

It is a requirement of bitstream conformance that the value of pic_rpl_present_flag shall be equal to 0 when sps_id_rpl_present_flag is equal to 0 and the picture associated with the PH is an IDR picture.

pic_rpl_sps_flag[i] equal to 1 specifies that reference picture list i for the picture associated with the PH is derived based on one of the ref_pic_list_struct(listIdx, rplsIdx) syntax structures with listIdx equal to i in the SPS. ref_pic_list_sps_flag[i] equal to 0 specifies that reference picture list i of the picture is derived based on the ref_pic_list_struct(listIdx, rplsIdx) syntax structure with listIdx equal to i that is directly included in the PH.

When pic_rpl_sps_flag[i] is not present, the following applies:
  If num_ref_pic_lists_in_sps[i] is equal to 0, the value of pic_rpl_sps_flag[i] is inferred to be equal to 0.
  Otherwise, if num_ref_pic_lists_in_sps[i] is greater than 0 and rpl1_idx_present_flag is equal to 0, the value of pic_rpl_sps_flag[1] is inferred to be equal to pic_rpl_sps_flag[0].
  Otherwise, the value of pic_rpl_sps_flag[i] is inferred to be equal to pps_ref_pic_list_sps_idc[i]−1.

pic_rpl_idx[i] specifies the index, into the list of the ref_pic_list_struct(listIdx, rplsIdx) syntax structures with listIdx equal to i included in the SPS, of the ref_pic_list_struct (listIdx, rplsIdx) syntax structure with listIdx equal to i that is used for derivation of reference picture list i of the current picture. The syntax element pic_rpl_idx[i] is represented by Ceil(Log 2(num_ref_pic_lists_in_sps[i])) bits. When not present, the value of pic rpl_idx[i] is inferred to be equal to 0. The value of pic_rpl_idx[i] shall be in the range of 0 to num_ref_pic_lists_in_sps[i]−1, inclusive. When pic_rpl_sps_flag[i] is equal to 1 and num_ref_pic_lists_in_sps[i] is equal to 1, the value of pic_rpl_idx[i] is inferred to be equal to 0. When pic_rpl_sps_flag[i] is equal to 1 and rpl1_idx_present_flag is equal to 0, the value of pic_rpl_idx [1] is inferred to be equal to pic_rpl_idx[0].

The variable PicRplsIdx[i] is derived as follows:
PicRplsIdx[i]=pic_rpl_sps_flag[i] ? pic_rpl_idx[i] num_ref_pic_lists_in_sps[i]

pic_poc_lsb_lt[i][j] specifies the value of the picture order count modulo MaxPicOrderCntLsb of the j-th LTRP entry in the i-th reference picture list for the picture associated with the PH. The length of the pic_poc_lsb_lt[i] [j] syntax element is log 2_max_pic_order_cnt_lsb_minus4+4 bits. The variable PicPocLsbLt[i][j] is derived as follows:

```
PicPocLsbLt[ i ][ j ] =
  ltrp_in_slice_header_flag[ i ][ PicRplsIdx[ i ] ] ?
    pic_poc_lsb_lt[ i ][ j ] :
    rpls_poc_lsb_lt[ listIdx ][ PicRplsIdx[ i ] ][ j ]
``` pic_delta_poc_msb_present_flag[i][j] equal to 1 specifies that pic_delta_poc_msb_cycle_lt[i][j] is present. pic_delta_poc_msb_present_flag[i][j] equal to 0 specifies that pic_delta_poc_msb_cycle_lt[i][j] is not present.

Let prevTid0Pic be the previous picture in decoding order that has nuh_layer_id the same as the PH, has TemporalId equal to 0, and is not a RASL or RADL picture. Let setOfPrevPocVals be a set consisting of the following:
  the PicOrderCntVal of prevTid0Pic.
  the PicOrderCntVal of each picture that is referred to by entries in RefPicList[0] or RefPicList[1] of prevTid0Pic and has nuh_layer_id the same as the current picture,
  the PicOrderCntVal of each picture that follows prevTid0Pic in decoding order, has nuh_layer_id the same as the current picture, and precedes the current picture in decoding order.

When there is more than one value in setOfPrevPocVals for which the value modulo MaxPicOrderCntLsb is equal to PicPocLsbLt[i][j], the value of pic_delta_poc_msb_present_flag[i][j] shall be equal to 1.

pic_delta_poc_msb_cycle_lt[i][j] specifies the value of the variable PicFullPocLt[i][j] as follows:

```
if( j = = 0 )
  deltaPocMsbCycleLt[ i ][ j ] = pic_delta_poc_msb_cycle_lt[ i ][ j ]
else
  deltaPocMsbCycleLt[ i ][ j ] = pic_delta_poc_msb_cycle_lt[ i ][ j ] +
    deltaPocMsbCycleLt[ i ][ j − 1 ]
PicFullPocLt[ i ][ j ] = PicOrderCntVal − deltaPocMsbCycleLt[ i ][ j ] *
  MaxPicOrderCntLsb −
  ( PicOrderCntVal & ( MaxPicOrderCntLsb − 1 ) ) +
  PicPocLsbLt[ i ][ j ]
```

The value of pic_delta_poc_msb_cycle_lt[i][j] shall be in the range of 0 to $2^{(32-\log 2\_max\_pic\_order\_ent\_lsb\_minus4-4)}$, inclusive. When not present, the value of pic_delta_poc_msb_cvcle_lt[i][j] is inferred to be equal to 0.

As described above, a ref_pic_list_struct( ) syntax structure may be present in SPS or a slice header. Table 7 illustrates the syntax of the slice header provided in JVET-P2001.

TABLE 7

|  | Descriptor |
|---|---|
| slice_header( ) { |  |
|   slice_pic_order_cnt_lsb | u(v) |
|   if( subpics_present_flag ) |  |
|     slice_subpic_id | u(v) |
|   if( rect_slice_flag \|\| NumTilesInPic > 1 ) |  |
|     slice_address | u(v) |
|   if( !rect_slice_flag && NumTilesInPic > 1 ) |  |
|     num_tiles_in_slice_minus1 | ue(v) |
|   slice_type | ue(v) |
|   if( !pic_rpl_present_flag &&( ( nal_unit_type != IDR_W_RADL && nal_unit_type != |  |
|         IDR_N_LP ) \|\| sps_idr_rpl_present_flag ) ) { |  |
|     for( i = 0; i < 2; i++ ) { |  |
|       if( num_ref_pic_lists_in_sps[ i ] > 0 && !pps_ref_pic_list_sps_idc[ i ] && |  |
|         ( i = = 0 \|\| ( i = = 1 && rpl1_idx_present_flag ) ) ) |  |
|         slice_rpl_sps_flag[ i ] | u(1) |
|       if( slice_rpl_sps_flag[ i ] ) { |  |
|         if( num_ref_pic_lists_in_sps[ i ] > 1 && |  |
|           ( i = = 0 \|\| ( i = = 1 && rpl1_idx_present_flag ) ) ) |  |

TABLE 7-continued

| | Descriptor |
|---|---|
|      slice_rpl_idx[ i ] | u(v) |
|    } else | |
|      ref_pic_list_struct( i, num_ref_pic_lists_in_sps[ i ] ) | |
|    for( j = 0; j < NumLtrpEntries[ i ][ RplsIdx[ i ] ]; j++ ) { | |
|      if( ltrp_in_slice_header_flag[ i ][ RplsIdx[ i ] ] ) | |
|        slice_poc_lsb_lt[ i ][ j ] | u(v) |
|      slice_delta_poc_msb_present_flag[ i ][ j ] | u(1) |
|      if( slice_delta_poc_msb_present_flag[ i ][ j ] ) | |
|        slice_delta_poc_msb_cycle_lt[ i ][ j ] | ue(v) |
|    } | |
|  } | |
| } | |
| if( pic_rpl_present_flag \|\| ( ( nal_unit_type != IDR_W_RADL && nal_unit_type != | |
|    IDR_N_LP ) \|\| sps_idr_rpl_present_flag ) ) { | |
|  if( ( slice_type != I && num_ref_entries[ 0 ][ RplsIdx[ 0 ] ] > 1) \|\| | |
|    ( slice_type = = B && num_ref_entries[ 1 ][ RplsIdx[ 1 ] ] > 1 ) ) { | |
|    num_ref_idx_active_override_flag | u(1) |
|    if( num_ref_idx_active_override_flag ) | |
|      for( i = 0; i < ( slice_type = = B ? 2: 1 ); i++ ) | |
|        if( num_ref_entries[ i ][ RplsIdx[ i ] ] > 1 ) | |
|          num_ref_idx_active_minus1[ i ] | ue(v) |
|  } | |
| } | |
| if( slice_type != I ) { | |
|  if( cabac_init_present_flag ) | |
|    cabac_init_flag | u(1) |
|  if( pic_temporal_mvp_enabled_flag ) { | |
|    if( slice_type = = B && !pps_collocated_from_l0_idc ) | |
|      collocated_from_l0_flag | u(1) |
|    if( ( collocated_from_l0_flag && NumRefIdxActive[ 0 ] > 1 ) \|\| | |
|      ( !collocated_from_l0_flag && NumRefIdxActive[ 1 > 1 ) ) | |
|      collocated_ref_idx | ue(v) |
|  } | |
|  if( ( pps_weighted_pred_flag && slice_type = = P ) \|\| | |
|    ( pps_weighted_bipred_flag && slice_type = = B ) ) | |
|    pred_weight_table( ) | |
| } | |
| slice_qp_delta | se(v) |
| if( pps_slice_chroma_qp_offsets_present_flag ) { | |
|  slice_cb_qp_offset | se(v) |
|  slice_cr_qp_offset | se(v) |
|  if( sps_joint_cbcr_enabled_flag ) | |
|    slice_joint_cbcr_qp_offset | se(v) |
| } | |
| if( pps_cu_chroma_qp_offset_list_enabled_flag ) | |
|  cu_chroma_qp_offset_enabled_flag | u(1) |
| if( sps_sao_enabled_flag && !pic_sao_enabled_present_flag ) { | |
|  slice_sao_luma_flag | u(1) |
|  if( ChromaArrayType != 0 ) | |
|    slice_sao_chroma_flag | u(1) |
| } | |
| if( sps_alf_enabled_flag && !pic_alf_enabled_present_flag ) { | |
|  slice_alf_enabled_flag | u(1) |
|  if( slice_alf_enabled_flag ) { | |
|    slice_num_alf_aps_ids_luma | u(3) |
|    for( i = 0; i < slice_num_alf_aps_ids_luma; i++ ) | |
|      slice_alf_aps_id_luma[ i ] | u(3) |
|    if( ChromaArrayType != 0 ) | |
|      slice_alf_chroma_idc | u(2) |
|    if( slice_alf_chroma_idc ) | |
|      slice_alf_aps_id_chroma | u(3) |
|  } | |
| } | |
| if( deblocking_filter_override_enabled_flag && | |
|    !pic_deblocking_filter_override_present_flag ) | |
|  slice_deblocking_filter_override_flag | u(1) |
| if( slice_deblocking_filter_override_flag ) { | |
|  slice_deblocking_filter_disabled_flag | u(1) |
|  if( !slice_deblocking_filter_disabled_flag ) { | |
|    slice_beta_offset_div2 | se(v) |
|    slice_tc_offset_div2 | se(v) |
|  } | |
| } | |
| if( entry_point_offsets_present_flag && NumEntryPoints > 0 ) { | |
|  offset_len_minus1 | ue(v) |
|  for( i = 0; i < NumEntryPoints; i++ ) | |
|    entry_point_offset_minus1[ i ] | u(v) |
| } | |

TABLE 7-continued

| | Descriptor |
|---|---|
| if( slice_header_extension_present_flag ) {  slice_header_extension_length    for( i = 0; i < slice_header_extension_length; i++)      slice_header_extension_data_byte[ i ] } byte_alignment( ) } | ue(v)  u(8) |

With respect to Table 7, JVET-P2001 provides the following semantics:

When present, the value of the slice header syntax element slice_pic_order_cnt_lsb shall be the same in all slice headers of a coded picture.

The variable CuQpDeltaVal, specifying the difference between a luma quantization parameter for the coding unit containing cu_qp_delta_abs and its prediction, is set equal to 0. The variables $CuQpOffset_{Cb}$, $CuQpOffset_{Cr}$, and $CuQpOffset_{CbCr}$, specifying values to be used when determining the respective values of the $Qp'_{Cb}$, $Qp'_{Cr}$, and $Qp'C_bCr$ quantization parameters for the coding unit containing cu_chroma_qp_offset_flag, are all set equal to 0.

slice_pic_order_cnt_lsb specifies the picture order count modulo MaxPicOrderCntLsb for the current picture. The length of the slice_pic_order_cnt_lsb syntax element is log 2_max_pic_order_cnt_lsb_minus4+4 bits. The value of the slice_pic_order_cnt_lsb shall be in the range of 0 to MaxPicOrderCntLsb 1, inclusive.

When the current picture is a GDR picture, the variable RpPicOrderCntVal is derived as follows:

RpPicOrderCntVal=PicOrderCntVal+recovery_poc_cnt slice_subpic_id specifies the subpicture identifier of the subpicture that contains the slice. If slice_subpic_id is present, the value of the variable SubPicIdx is derived to be such that SubpicIdList[SubPicIdx] is equal to slice_subpic_id. Otherwise (slice_subpic_id is not present), the variable SubPicIdx is derived to be equal to 0. The length of slice_subpic_id, in bits, is derived as follows:

If sps_subpic_id_signalling_present_flag is equal to 1, the length of slice_subpic_id is equal to sps_subpic_id_len_minus1+1.

Otherwise, if ph_subpic_id_signalling_present_flag is equal to 1, the length of slice_subpic_id is equal to ph_subpic_id_len_minus1+1.

Otherwise, if pps_subpic_id_signalling_present_flag is equal to 1, the length of slice_subpic_id is equal to pps_subpic_id_len_minus1+1.

Otherwise, the length of slice_subpic_id is equal to Ceil (Log 2(sps_num_subpics_minus1+1)).

slice_address specifies the slice address of the slice. When not present, the value of slice_address is inferred to be equal to 0.

If rect_slice_flag is equal to 0, the following applies:
The slice address is the raster scan tile index.
The length of slice_address is Ceil(Log 2(NumTilesInPic)) bits.
The value of slice_address shall be in the range of 0 to NumTilesInPic−1, inclusive.

Otherwise (rect_slice_flag is equal to 1), the following applies:
The slice address is the slice index of the slice within the SubPicIdx-th subpicture.
The length of slice_address is Ceil(Log 2(NumSlicesInSubpic[SubPicIdx])) bits.
The value of slice_address shall be in the range of 0 to NumSlicesInSubpic[SubPicIdx]−1, inclusive.

It is a requirement of bitstream conformance that the following constraints apply:
If rect_slice_flag is equal to 0 or subpics_present_flag is equal to 0, the value of slice-address shall not be equal to the value of slice_address of any other coded slice NAL unit of the same coded picture.
Otherwise, the pair of slice_subpic_id and slice_address values shall not be equal to the pair of slice_subpic_id and slice_address values of any other coded slice NAL unit of the same coded picture.
When rect_slice_flag is equal to 0, the slices of a picture shall be in increasing order of their slice_address values.
The shapes of the slices of a picture shall be such that each CTU, when decoded, shall have its entire left boundary and entire top boundary consisting of a picture boundary or consisting of boundaries of previously decoded CTU(s).

num_tiles_in_slice_minus1 plus 1, when present, specifies the number of tiles in the slice. The value of num_tiles_in_slice_minus1 shall be in the range of 0 to NumTilesInPic−1, inclusive.

The variable NumCtuInCurrSlice, which specifies the number of CTUs in the current slice, and the list CtbAddrInCurrSlice[i], for i ranging from 0 to NumCtuInCurrSlice−1, inclusive, specifying the picture raster scan address of the i-th CTB within the slice, are derived as follows:

```
if( rect_slice_flag ) {
  picLevelSliceIdx = SliceSubpicToPicIdx[ SubPicIdx ][ slice_address ]
  NumCtuInCurrSlice = NumCtuInSlice[ picLevelSliceIdx ]
  for( i = 0; i < NumCtuInCurrSlice; i++ )
    CtbAddrInCurrSlice[ i ] = CtbAddrInSlice[ picLevelSliceIdx ][ i ]
} else {
  NumCtuInCurrSlice = 0
  for( tileIdx = slice address; tileIdx <= slice_address +
num_tiles_in_slice_minus1[ i ]; tileIdx++ ) {
    tileX = tileIdx % NumTileColumns
    tileY = tileIdx / NumTileColumns
    for( ctbY = tileRowBd[ tileY ]; ctbY < tileRowBd[ tileY + 1 ];
ctbY++ ) {
      for( ctbX = tileColBd[ tileX ]; ctbX < tileColBd[ tileX + 1 ];
ctbX++ ) {
        CtbAddrInCurrSlice[ NumCtuInCurrSlice ] = ctbY *
PicWidthInCtb + ctbX
        NumCtuInCurrSlice++
      }
    }
  }
}
```

The variables SubPicLeftBoundaryPos, SubPicTopBoundaryPos, SubPicRightBoundaryPos, and SubPicBotBoundaryPos are derived as follows:

```
if( subpic_treated_as_pic_flag[ SubPicIdx ] ) {
   SubPicLeftBoundaryPos = subpic_ctu_top_left_x[ SubPicIdx ] * CtbSizeY
   SubPicRightBoundaryPos = Min( pic_width_max_in_luma_samples − 1,
   ( subpic_ctu_top_left_x[ SubPicIdx ] + subpic_width_minus1[ SubPicIdx ] + 1 ) *
   CtbSizeY − 1)
   SubPicTopBoundaryPos = subpic_ctu_top_left_y[ SubPicIdx ] *CtbSizeY
   SubPicBotBoundaryPos = Min( pic_height_max_in_luma_samples − 1,
   ( subpic_ctu_top_left_y[ SubPicIdx ] + subpic_height_minus1[ SubPicIdx ] + 1) *
   CtbSizeY − 1
   )
}
``` slice_type specifies the coding type of the slice according to Table 8.

TABLE 8

| slice_type | Name of slice_type |
|---|---|
| 0 | B (B slice) |
| 1 | P (P slice) |
| 2 | I (I slice) |

When nal_unit_type is a value of nal_unit_type in the range of IDR_W_RADL to CRA_NUT, inclusive, and the current picture is the first picture in an access unit, slice_type shall be equal to 2.
The variables MinQt Log 2SizeY, MinQt Log 2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC are derived as follows:

```
MinQtSizeY = 1 << MinQtLog2SizeY
MinQtSizeC = 1 << MinQtLog2SizeC
MinBtSizeY = 1 << MinCbLog2SizeY
MinTtSizeY = 1 << MinCbLog2SizeY
```

If slice_type equal to 2 (I),

```
MinQtLog2SizeY = MinCbLog2SizeY + pic_log2_diff_min_qt_min_cb_intra_slice_luma
MinQtLog2SizeC = MinCbLog2SizeC + pic_log2_diff_min_qt_min_cb_intra_slice_chroma
MaxBtSizeY = 1 << ( MinQtLog2SizeY + pic_log2_diff_max_bt_min_qt_intra_slice_luma )
MaxBtSizeC = 1 << ( MinQtLog2SizeC + pic_log2_diff_max_bt_min_qt_intra_slice_chroma )
MaxTtSizeY = 1 << ( MinQtLog2SizeY + pic_log2_diff_max_tt_min_qt_intra_slice_luma )
MaxTtSizeC = 1 << ( MinQtLog2SizeC + pic_log2_diff_max_tt_min_qt_intra_slice_chroma )
MaxMttDepthY = pic_max_mtt_hierarchy_depth_intra_slice_luma
MaxMttDepthC = pic_max_mtt_hierarchy_depth_intra_slice_chroma
CuQpDeltaSubdiv = pic_cu_qp_delta_subdiv_intra_slice
CuChromaQpOffsetSubdiv = pic_cu_chroma_qp_offset_subdiv_intra_slice
Otherwise (slice_type equal to 0 (B) or 1 (P)),
MinQtLog2SizeY = MinCbLog2SizeY + pic_log2_diff_min_qt_min_cb_inter_slice
MinQtLog2SizeC = MinCbLog2SizeC + pic_log2_diff_min_qt_min_cb_inter_slice
MaxBtSizeY = 1 << ( MinQtLog2SizeY + pic_log2_diff_max_bt_min_qt_inter_slice)
MaxBtSizeC = 1 << ( MinQtLog2SizeC + pic_log2_diff_max_bt_min_qt_inter_slice)
MaxTtSizeY = 1 << ( MinQtLog2SizeY + pic_log2_diff_max_tt_min_qt_inter_slice)
MaxTtSizeC = 1 << ( MinQtLog2SizeC + pic_log2_diff_max_tt_min_qt_inter_slice)
MaxMttDepthY = pic_max_mtt_hierarchy_depth_inter_slice
MaxMttDepthC = pic_max_mtt_hierarchy_depth_inter_slice
CuQpDeltaSubdiv = pic_cu_qp_delta_subdiv_inter_slice
CuChromaQpOffsetSubdiv = pic_cu_chroma_qp_offset_subdiv_inter_slice
``` slice_rpl_sps_flag[i] equal to 1 specifies that reference picture list i of the current slice is derived based on one of the ref_pic_list_struct(listIdx, rplsIdx) syntax structures with listIdx equal to i in the SPS. slice_rpl_sps_flag[i] equal to 0 specifies that reference picture list i of the current slice is derived based on the ref_pic_list_struct(listIdx, rplsIdx) syntax structure with listIdx equal to i that is directly included in the slice headers of the current picture.

When slice_rpl_sps_flag[i] is not present, the following applies:
  If pic_rpl_present_flag is equal to 1, the value of slice_rpl_sps_flag[i] is inferred to be equal to pic_rpl_sps_flag[i].
  Otherwise, if num_ref_pic_lists_in_sps[i] is equal to 0, the value of ref_pic_list_sps_flag[i] is inferred to be equal to 0.
  Otherwise, if num_ref_pic_lists_in_sps[i] is greater than 0 and if rpl1_idx_present_flag is equal to 0, the value of slice_rpl_sps_flag[1] is inferred to be equal to slice_rpl_sps_flag[0].
slice_rpl_idx[i] specifies the index, into the list of the ref_pic_list_struct(listIdx, rplsIdx) syntax structures with listIdx equal to i included in the SPS, of the ref_pic_list_struct(listIdx, rplsIdx) syntax structure with listIdx equal to i that is used for derivation of reference picture list i of the current picture. The syntax element slice_rpl_idx[i] is represented by Ceil(Log 2(num_ref_pic_lists_in_sps[i])) bits. When not present, the value of slice_rpl_idx[i] is inferred to be equal to 0. The value of slice_rpl_idx[i] shall be in the range of 0 to num_ref_pic_lists_in_sps[i]−1, inclusive. When slice_rpl_sps_flag[i] is equal to 1 and num_ref_pic_lists_in_sps[i] is equal to 1, the value of slice_rpl_idx[i] is inferred to be equal to 0. When slice_rpl_sps_flag[i] is equal to 1 and rpl1_idx_present_flag is equal to 0, the value of slice_rpl_idx[1] is inferred to be equal to slice_rpl_idx[0]. The variable RplsIdx[i] is derived as follows:

```
if( pic_rpl_present_flag )
   RplsIdx[ i ] = PicRplsIdx[ i ]
else
```

-continued

```
RplsIdx[ i ] = slice_rpl_sps_flag[ i ] ? slice_rpl_idx[ i ] :
   num_ref_pic_lists_in_sps[ i ]
``` slice_poc_lsb_lt[i][j] specifies the value of the picture order count modulo MaxPicOrderCntLsb of the j-th LTRP entry in the i-th reference picture list. The length of the slice_poc_lsb_lt[i][j] syntax element is log 2_max_pic_order_cnt_lsb_minus4+4 bits.
The variable PocLsbLt[i][j] is derived as follows:

```
if( pic_rpl_present_flag )
   PocLsbLt[ i ][ j ] = PicPocLsbLt[ i ][ j ]
else
   PocLsbLt[ i ][ j ] = ltrp_in_slice_header_flag[ i ][ RplsIdx[ i ] ] ?
      slice_poc_lsb_lt[ i ][ j ] :
      rpls_poc_lsb_lt[ listIdx ][ RplsIdx[ i ] ][ j ]
``` slice_delta_poc_msb_present_flag[i][j] equal to 1 specifies that slice_delta_poc_msb_cycle_lt[i][j] is present. slice_delta_poc_msb_present_flag[i][j] equal to 0 specifies that slice_ delta_poc_msb_cycle_lt[i][j] is not present.
Let prevTid0Pic be the previous picture in decoding order that has nuh_layer_id the same as the current picture, has TemporalId equal to 0, and is not a RASL or RADL picture.
Let setOfPrevPocVals be a set consisting of the following:
   the PicOrderCntVal of prevTid0Pic,
      the PicOrderCntVal of each picture that is referred to by entries in RefPicList[0] or RefPicList[1] of prevTid0Pic and has nuh_layer_id the same as the current picture,
      the PicOrderCntVal of each picture that follows prevTid0Pic in decoding order, has nuh_layer_id the same as the current picture, and precedes the current picture in decoding order.
When pic_rpl_present_flag is equal to 0 and there is more than one value in setOfPrevPocVals for which the value modulo MaxPicOrderCntLsb is equal to PocLsbLt[i][j] the value of slice_delta_poc_msb_present_flag[i][j] shall be equal to 1.
slice_delta_poc_msb_cycle_lt[i][j] specifies the value of the variable FullPocLt[i][j] as follows:

```
if( pic_rpl_present_flag )
   FullPocLt[ i ][ j ] = PicFullPocLt[ i ][ j ]
else {
   if( j = = 0 )
      DeltaPocMsbCycleLt[ i ][ j ] = delta_poc_msb_cycle_lt[ i ][ j ]
   else
      DeltaPocMsbCycleLt[ i ][ j ] = delta_poc_msb_cycle_lt[ i ][ j ] +
DeltaPocMsbCycleLt[ i ][ j − 1 ]
   FullPocLt[ i ][ j ] = PicOrderCntVal − DeltaPocMsbCycleLt[ i ][ j ] *
   MaxPicOrderCntLsb −
      ( PicOrderCntVal & ( MaxPicOrderCntLsb − 1 ) ) +
      PocLsbLt[ i ][ j ]
}
```

The value of slice_delta_poc_msb_cycle_lt[i][j] shall be in the range of 0 to $2^{(32-log\ 2\ max\ pic\ order\ cnt\ lsb\ minus\ 4-4)}$, inclusive. When not present, the value of slice_delta_poc_msb_cycle_lt[i][j] is inferred to be equal to 0.
num_ref_idx_active_override_flag equal to 1 specifies that the syntax element num_ref_idx_active_minus1[0] is present for P and B slices and that the syntax element num_ref_idx_active_minus1[1] is present for B slices. num_ref_idx_active_override_flag equal to 0 specifies that the syntax elements num_ref_idx_active_minus1[0] and num_ref_idx_active_minus1[1] are not present. When not present, the value of num_ref_idx_active_override_flag is inferred to be equal to 1.
num_ref_idx_active_minus1[i] is used for the derivation of the variable NumRefIdxActive[i] as specified by Equation 145. The value of num_ref_idx_active_minus1[i] shall be in the range of 0 to 14, inclusive.
For i equal to 0 or 1, when the current slice is a B slice, num_ref_idx_active_override_flag is equal to 1, and num_ref_idx_active_minus1[i] is not present, num_ref_idx_active_minus1[i] is inferred to be equal to 0.
When the current slice is a P slice, num_ref_idx_active_override_flag is equal to 1, and num_ref_idx_active_minus1[0] is not present, num_ref_idx_active_minus1[0] is inferred to be equal to 0.
The variable NumRefIdxActive[i] is derived as follows:

```
for( i = 0; i < 2; i++ ) {
   if( slice_type = = B | | ( slice_type = = P && i = = 0 ) ) {
      if( num_ref_idx_active_override_flag )
         NumRefIdxActive[ i ] = num_ref_idx_active_minus1[ i ] + 1
      else {
         if( num_ref_entries[ i ][ RplsIdx[ i ] ] >=
         num_ref_idx_default_active_minus1[ i ] + 1 )
            NumRefIdxActive[ i ] =
            num_ref_idx_default_active_minus1[ i ] + 1
         else
            NumRefIdxActive[ i ] = num_ref_entries[ i ][ RplsIdx[ i ] ]
      }
   } else /* slice_type = = I | | ( slice_type = = P && i = = 1 ) */
      NumRefIdxActive[ i ] = 0
}
```

The value of NumRefIdxActive[i]−1 specifies the maximum reference index for reference picture list i that may be used to decode the slice. When the value of NumRefIdxActive[i] is equal to 0, no reference index for reference picture list i may be used to decode the slice.
When the current slice is a P slice, the value of NumRefIdxActive[0] shall be greater than 0.
When the current slice is a B slice, both NumRefIdxActive[0] and NumRefIdxActive[1] shall be greater than 0.
cabac_init_flag specifies the method for determining the initialization table used in the initialization process for context variables. When cabac_init_flag is not present, it is inferred to be equal to 0.
collocated_from_l0_flag equal to 1 specifies that the collocated picture used for temporal motion vector prediction is derived from reference picture list 0. collocated_from_l0_flag equal to 0 specifies that the collocated picture used for temporal motion vector prediction is derived from reference picture list 1.
When collocated_from_l0_flag is not present, the following applies:
   If slice type is not equal to B, the value of collocated_from_l0_flag is inferred to be equal to 1.
   Otherwise (slice type is equal to B), the value of collocated_from_l0_flag is inferred to be equal to pps_collocated_from_l0_idc−1.
collocated_ref_idx specifies the reference index of the collocated picture used for temporal motion vector prediction. When slice_type is equal to P or when slice type is equal to B and collocated_from_l0_flag is equal to 1, collocated_ref_idx refers to a picture in list 0, and the value of collocated_ref_idx shall be in the range of 0 to NumRefIdxActive[0]−1, inclusive.

When slice_type is equal to B and collocated_from_l0_flag is equal to 0, collocated_ref_idx refers to a picture in list 1, and the value of collocated_ref_idx shall be in the range of 0 to NumRefIdxActive[1]−1, inclusive.

When collocated_ref_idx is not present, the value of collocated_ref_idx is inferred to be equal to 0.

It is a requirement of bitstream conformance that the picture referred to by collocated_ref_idx shall be the same for all slices of a coded picture.

It is a requirement of bitstream conformance that the resolutions of the reference picture referred to by collocated_ref_idx and the current picture shall be the same and RefPicIsScaled[collocated_from_l0_flag?0:1][collocated_ref_idx] shall be equal to 0.

slice_qp_delta specifies the initial value of $Qp_Y$ to be used for the coding blocks in the slice until modified by the value of CuQpDeltaVal in the coding unit layer. The initial value of the $Qp_Y$ quantization parameter for the slice, $SliceQp_Y$, is derived as follows:

$$SliceQp_Y = 26 + init\_qp\_minus26 + slice\_qp\_delta$$

The value of $SliceQp_Y$ shall be in the range of −QpBdOffset to +63, inclusive.

slice_cb_qp_offset specifies a difference to be added to the value of pps_cb_qp_offset when determining the value of the $Qp'_{Cb}$ quantization parameter. The value of slice_cb_qp_offset shall be in the range of −12 to +12, inclusive. When slice_cb_qp_offset is not present, it is inferred to be equal to 0. The value of pps_cb_qp_offset+slice_cb_qp_offset shall be in the range of −12 to +12, inclusive.

slice_cr_qp_offset specifies a difference to be added to the value of pps_cr_qp_offset when determining the value of the $Qp'_{Cr}$ quantization parameter. The value of slice_cr_qp_offset shall be in the range of −12 to +12, inclusive. When slice_cr_qp_offset is not present, it is inferred to be equal to 0. The value of pps_cr_qp_offset+slice_cr_qp_offset shall be in the range of −12 to +12, inclusive.

slice_joint_cbcr_qp_offset specifies a difference to be added to the value of pps_joint_cbcr_qp_offset_value when determining the value of the $Qp'_{CbCr}$. The value of slice_joint_cbcr_qp_offset shall be in the range of −12 to +12, inclusive. When slice_joint_cbcr_qp_offset is not present, it is inferred to be equal to 0. The value of pps_joint_cbcr_qp_offset_value+slice_joint_cbcr_qp_offset shall be in the range of −12 to +12, inclusive.

cu_chroma_qp_offset_enabled_flag equal to 1 specifies that the cu_chroma_qp_offset_flag may be present in the transform unit and palette coding syntax. cu_chroma_qp_offset_enabled_flag equal to 0 specifies that the cu_chroma_qp_offset_flag is not present in the transform unit or palette coding syntax. When not present, the value of cu_chroma_qp_offset_enabled_flag is inferred to be equal to 0.

slice_sao_luma_flag equal to 1 specifies that SAO is enabled for the luma component in the current slice; slice_sao_luma_flag equal to 0 specifies that SAO is disabled for the luma component in the current slice. When slice_sao_luma_flag is not present, it is inferred to be equal to pic_sao_luma_enabled_flag.

slice_sao_chroma_flag equal to 1 specifies that SAO is enabled for the chroma component in the current slice; slice_sao_chroma_flag equal to 0 specifies that SAO is disabled for the chroma component in the current slice. When slice_sao_chroma_flag is not present, it is inferred to be equal to pic_sao_chroma_enabled_flag.

slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice. When not present, the value of slice_alf_enabled_flag is inferred to be equal to pic_alf_enabled_flag.

slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of pic_num_alf_aps_ids_luma.

slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] shall be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of pic_alf_aps_id_luma[i].

The value of alf_luma_filter_signal_flag of the APS NAL unit having aps_params_type equal to ALF_APS and adaptation_parameter_set_id equal to slice_alf_aps_id_luma[i] shall be equal to 1.

slice_alf_chroma_idc equal to 0 specifies that the adaptive loop filter is not applied to Cb and Cr colour components. slice_alf_chroma_idc equal to 1 indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to pic_alf_chroma_idc.

slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of pic_alf_aps_id_chroma.

The value of alf_chroma_filter_signal_flag of the APS NAL unit having aps_params_type equal to ALF_APS and adaptation_parameter_set_id equal to slice_alf_aps_id_chroma shall be equal to 1.

slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to pic_deblocking_filter_override_flag.

slice_deblocking_filter_disabled_flag equal to 1 specifies that the operation of the deblocking filter is not applied for the current slice. slice_deblocking_filter_disabled_flag equal to 0 specifics that the operation of the deblocking filter is applied for the current slice. When slice_deblocking_filter_disabled_flag is not present, it is inferred to be equal to pic_deblocking_filter_disabled_flag.

slice_beta_offset_div 2 and slice_tc_offset_div 2 specify the deblocking parameter offsets for β and tC (divided by 2) for the current slice. The values of slice_beta_offset_div 2 and slice_tc_offset_div 2 shall both be in the range of −6 to 6, inclusive. When not present, the values of slice_beta_offset_div 2 and slice_tc_offset_div 2 are inferred to be equal to pic_beta_offset_div 2 and pic_tc_offset_div 2, respectively.

When entry_point_offsets_present_flag is equal to 1, the variable NumEntryPoints, which specifies the number of entry points in the current slice, is derived as follows:

```
NumEntryPoints = 0
for( i = 1; 1 < NumCtuInCurrSlice; i++ ) {
    CtbAddrInRs = CtbAddrInCurrSlice[ i ]
    CtbAddrX = ( CtbAddrInRs % PicWidthInCtbsY )
    CtbAddrY = ( CtbAddrInRs / PicWidthInCtbsY )
    if( CtbAddrX = = CtbToTileColBd[ CtbAddrX ] &&
        ( CtbAddrY = = CtbToTileRowBd[ CtbAddrY ] | |
        entropy_coding_sync_enabled_flag ) )
        NumEntryPoints++
}
``` offset_len_minus1 plus 1 specifies the length, in bits, of the entry_point_offset_minus1[i] syntax elements. The value of offset_len_minus1 shall be in the range of 0 to 31, inclusive. entry_point_offset_minus1[i] plus 1 specifies the i-th entry point offset in bytes, and is represented by offset_len_minus1 plus 1 bits. The slice data that follow the slice header consists of NumEntryPoints+1 subsets, with subset index values ranging from 0 to NumEntryPoints, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to entry_point_offset_minus1[0], inclusive, of the coded slice data, subset k, with k in the range of 1 to NumEntryPoints−1, inclusive, consists of bytes firstByte[k] to lastByte[k], inclusive, of the coded slice data with firstByte[k] and lastByte[k] defined as:

$$\text{firstByte}[ k ] = \Sigma_{n=1}^{k}( \text{entry\_point\_offset\_minus1}[ n - 1 ] + 1 )$$
$$\text{lastByte}[ k ] = \text{firstByte}[ k ] + \text{entry\_point\_offset\_minus1}[ k ]$$

The last subset (with subset index equal to NumEntryPoints) consists of the remaining bytes of the coded slice data.

When entropy_coding_sync_enabled_flag is equal to 0 and the slice contains one or more complete tiles, each subset shall consist of all coded bits of all CTUs in the slice that are within the same tile, and the number of subsets (i.e., the value of NumEntryPoints+1) shall be equal to the number of tiles in the slice.

When entropy_coding_sync_enabled_flag is equal to 0 and the slice contains a subset of CTU rows from a single tile, the NumEntryPoints shall be 0, and the number of subsets shall be 1. The subset shall consist of all coded bits of all CTUs in the slice. When entropy_coding_sync_enabled_flag is equal to 1, each subset k with k in the range of 0 to NumEntryPoints, inclusive, shall consist of all coded bits of all CTUs in a CTU row within a tile, and the number of subsets (i.e., the value of NumEntryPoints+1) shall be equal to the total number of tile-specific CTU rows in the slice.

slice_header_extension_length specifies the length of the slice header extension data in bytes, not including the bits used for signalling slice_header_extension_length itself. The value of slice_header_extension_length shall be in the range of 0 to 256, inclusive. When not present, the value of slice_header_extension_length is inferred to be equal to 0.

slice_header_extension_data_byte[i] may have any value. Decoders conforming to this version of this Specification shall ignore the values of all the slice_header_extension_data_byte[i] syntax elements. Its value does not affect decoder conformance to profiles specified in this version of specification.

With respect to Table 1 and Table 2, it should be noted that JVET-P2001 provides the following definitions:

clean random access (CRA) picture: An IRAP picture for which each VCL NAL unit has nal_unit_type equal to CRA_NUT.

NOTE—A CRA picture does not refer to any pictures other than itself for inter prediction in its decoding process, and may be the first picture in the bitstream in decoding order, or may appear later in the bitstream. A CRA picture may have associated RADL or RASL pictures. When a CRA picture has NoIncorrectPicOutputFlag equal to 1, the associated RASL pictures are not output by the decoder, because they may not be decodable, as they may contain references to pictures that are not present in the bitstream.

coded layer video sequence start (CLVSS) picture: A coded picture that is an IRAP picture with NoIncorrectPicOutputFlag equal to 1 or a GDR picture with NoIncorrectPicOutputFlag equal to 1.

gradual decoding refresh (GDR) picture: A picture for which each VCL NAL unit has nal_unit_type equal to GDR_NUT.

instantaneous decoding refresh (IDR) picture: An IRAP picture for which each VCL NAL unit has nal_unit_type equal to IDR_W_RADL or IDR_N_LP.

NOTE—An IDR picture does not refer to any pictures other than itself for inter prediction in its decoding process, and may be the first picture in the bitstream in decoding order, or may appear later in the bitstream. Each IDR picture is the first picture of a CVS in decoding order. When an IDR picture for which each VCL NAL unit has nal_unit_type equal to IDR_W_RADL, it may have associated RADL pictures. When an IDR picture for which each VCL NAL unit has nal_unit_type equal to IDR_N_LP, it does not have any associated leading pictures. An IDR picture does not have associated RASL pictures.

inter-layer reference picture (ILRP): A picture in the same access unit with the current picture, with nuh_layer_id less than the nuh_layer_id of the current picture, and is marked as "used for long-term reference".

intra random access point (IRAP) picture: A coded picture for which all VCL NAL units have the same value of nal_unit_type in the range of IDR_W_RADL to CRA_NUT, inclusive.

NOTE—An TRAP picture does not refer to any pictures other than itself for inter prediction in its decoding process, and may be a CRA picture or an IDR picture. The first picture in the bitstream in decoding order must be an TRAP or GDR picture. Provided the necessary parameter sets are available when they need to be referenced, the TRAP picture and all subsequent non-RASL pictures in the CVS in decoding order can be correctly decoded without performing the decoding process of any pictures that precede the TRAP picture in decoding order.

NOTE—The value of mixed_nalu_types_in_pic_flag for an TRAP picture is equal to 0. When mixed_nalu_types_in_pic_flag is equal to 0 for a picture, and any slice of the picture has nal_unit_type in the range of IDR_W_RADL to CRA_NUT, inclusive, all other slices of the picture have the same value of nal_unit_type, and the picture is known to be an TRAP picture.

leading picture: A picture that that is in the same layer as the associated TRAP picture and precedes the associated TRAP picture in output order.

long-term reference picture (LTRP): A picture with nuh_layer_id equal to the nuh_layer_id of the current picture and that is marked as "used for long-term reference".

random access decodable leading (RADL) picture: A coded picture for which each VCL NAL unit has nal_unit_type equal to RADL_NUT.

NOTE—All RADL pictures are leading pictures. RADL pictures are not used as reference pictures for the decoding process of trailing pictures of the same associated IRAP picture. When field_seq_flag is equal to 0, all RADL pictures, when present, precede, in decoding order, all non-leading pictures of the same associated IRAP picture.

random access skipped leading (RASL) picture: A coded picture for which each VCL NAL unit has nal_unit_type equal to RASL_NUT.

NOTE—All RASL pictures are leading pictures of an associated CRA picture. When the associated CRA picture has NoIncorrectPicOutputFlag equal to 1, the RASL picture is not output and may not be correctly decodable, as the RASL picture may contain references to pictures that are not present in the bitstream. RASL pictures are not used as reference pictures for the decoding process of non-RASL pictures. When field_seq_flag is equal to 0, all RASL pictures, when present, precede, in decoding order, all non-leading pictures of the same associated CRA picture.

short-term reference picture (STRP): A picture with nuh_layer_id equal to the nuh_layer_id of the current picture and that is marked as "used for short-term reference".

step-wise temporal sub-layer access (STSA) picture: A coded picture for which each VCL NAL unit has nal_unit_type equal to STSA_NUT.

NOTE—An STSA picture does not use pictures with the same TemporalId as the STSA picture for inter prediction reference. Pictures following an STSA picture in decoding order with the same TemporalId as the STSA picture do not use pictures prior to the STSA picture in decoding order with the same TemporalId as the STSA picture for inter prediction reference. An STSA picture enables up-switching, at the STSA picture, to the sublayer containing the STSA picture, from the immediately lower sublayer. STSA pictures must have TemporalId greater than 0.

JVET-P2001 provides the following decoding process for a picture order count of a current picture:

Output of this process is PicOrderCntVal, the picture order count of the current picture.

Each coded picture is associated with a picture order count variable, denoted as PicOrderCntVal.

If vps_independent_layer_flag[GeneralLayerIdx[nuh_layer_id]] is equal to 0 and there is a picture picA in the current AU in a reference layer of the current layer, PicOrderCntVal is derived to be equal to the PicOrderCntVal of picA, and the value of slice_pic_order_cnt_lsb shall be the same in all VCL NAL units of the current AU. Otherwise, PicOrderCntVal of the current picture is derived as specified below.

When ph_poc_msb_present_flag is equal to 0 and the current picture is not a CLVSS picture, the variables prevPicOrderCntLsb and prevPicOrderCntMsb are derived as follows:

Let prevTid0Pic be the previous picture in decoding order that has nuh_layer_id equal to the nuh_layer_id of the current picture and TemporalId equal to 0 and that is not a RASL or RADL picture.

The variable prevPicOrderCntLsb is set equal to slice_pic_order_cnt_lsb of prevTid0Pic.

The variable prevPicOrderCntMsb is set equal to PicOrderCntMsb of prevTid0Pic. The variable PicOrderCntMsb of the current picture is derived as follows:

If ph_poc_msb_present_flag is equal to 1, PicOrderCntMsb is set equal to poc_msb_val*MaxPicOrderCntLsb.

Otherwise (ph_poc_msb_present_flag is equal to 0), if the current picture is a CLVSS picture, PicOrderCntMsb is set equal to 0.

Otherwise, PicOrderCntMsb is derived as follows:

```
if( ( slice_pic_order_cnt_lsb < prevPicOrderCntLsb ) &&
    ( ( prevPicOrderCntLsb - slice_pic_order_cnt_lsb ) >=
    ( MaxPicOrderCntLsb / 2 ) ) )
  PicOrderCntMsb = prevPicOrderCntMsb + MaxPicOrderCntLsb
else if( ( slice_pic_order_cnt_lsb > prevPicOrderCntLsb ) &&
    ( ( slice_pic_order_cnt_lsb - prevPicOrderCntLsb ) >
    ( MaxPicOrderCntLsb / 2 ) ) )
  PicOrderCntMsb = prevPicOrderCntMsb - MaxPicOrderCntLsb
else
  PicOrderCntMsb = prevPicOrderCntMsb
```

PicOrderCntVal is derived as follows:
PicOrderCntVal=PicOrderCntMsb+slice_pic_order_cnt_lsb
NOTE—All CLVSS pictures for which poc_msb_val is not present will have PicOrderCntVal equal to slice_pic_order_cnt_lsb since for those pictures PicOrderCntMsb is set equal to 0. The value of PicOrderCntVal shall be in the range of $-2^{31}$ to $2^{31}-1$, inclusive.

In one CVS, the PicOrderCntVal values for any two coded pictures with the same value of nuh_layer_id shall not be the same.

All pictures in any particular AU shall have the same value of PicOrderCntVal.

The function PicOrderCnt(picX) is specified as follows:
PicOrderCnt(picX)=PicOrderCntVal of the picture picX The function DiffPicOrderCnt(picA, picB) is specified as follows:

DiffPicOrderCnt(picA,picB)=PicOrderCnt(picA)−PicOrderCnt(picB)

The bitstream shall not contain data that result in values of DiffPicOrderCnt(picA. picB) used in the decoding process that are not in the range of $-2^{15}$ to $2^{15}-1$, inclusive.

NOTE—Let X be the current picture and Y and Z be two other pictures in the same CVS, Y and Z are considered to be in the same output order direction from X when both DiffPicOrderCnt(X, Y) and DiffPicOrderCnt(X, Z) are positive or both are negative.

Further, JVET-P2001, provides the following decoding process for reference picture list construction:

This process is invoked at the beginning of the decoding process for each slice of a non-IDR picture. Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list I (i.e., RefPicList[1]) are used in decoding of the slice data.

At the beginning of the decoding process for each slice of a non-IDR picture, the reference picture lists RefPicList[0] and RefPicList[1] are derived. The reference picture lists are used in marking of reference pictures as specified or in decoding of the slice data.

NOTE—For an I slice of a non-IDR picture that it is not the first slice of the picture, RefPicList[0] and RefPicList[1]

may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order.

The reference picture lists RefPicList[0] and RefPicList[1], the reference picture scaling ratios RefPicScale[i][j][0] and RefPicScale[i][j][1], and the reference picture scaled flags RefPicIsScaled[0] and RefPicIsScaled[1] are constructed as follows:

NOTE—The active entries in RefPicList[0] and the active entries in RefPicList[1] collectively refer to all reference pictures that may be used for inter prediction of the current picture and one or more pictures that follow the current picture in decoding order. The inactive entries in RetPicList[0] and the inactive entries in RefPicList[1] collectively refer to all reference pictures that are not used for inter prediction of the current picture but may be used in inter prediction for one or more pictures that follow the current picture in decoding order.

NOTE—There may be one or more entries in RefPicList[0] or RefPicList[1] that are equal to "no reference picture" because the corresponding pictures are not present in the

```
for( i = 0; i < 2; i++ ) {
    for( j = 0, k = 0, pocBase = PicOrderCntVal; j < num_ref_entries[ i ][ RplsIdx[ i ] ]; j++) {
        if( !inter_layer_ref_pic_flag[ i ][ RplsIdx[ i ][ j ] ) {
            if( st_ref_pic_flag[ i ][ RplsIdx[ i ] ][ j ] ) {
                RefPicPocList[ i ][ j ] = pocBase − DeltaPocValSt[ i ][ RplsIdx[ i ] ][ j ]
                if( there is a reference picture picA in the DPB with the same nuh_layer_id as the
current picture and PicOrderCntVal equal to RefPicPocList[ i ][ j ] )
                    RefPicList[ i ][ j ] = picA
                else
                    RefPicList[ i ][ j ] = "no reference picture"
                pocBase = RefPicPocList[ i ][ j ]
            } else {
                if( !delta_poc_msb_cycle_lt[ i ][ k ] ) {
                    if( there is a reference picA in the DPB with the same nuh_layer_id as the current
picture and PicOrderCntVal & ( MaxPicOrderCntLsb − 1 ) equal to PocLsbLt[ i ][ k ] )
                        RefPicList[ i ][ j ] = picA
                    else
                        RefPicList[ i ][ j ] = "no reference picture"
                    RefPicLtPocList[ i ][ j ] = PocLsbLt[ i ][ k ]
                } else {
                    if( there is a reference picA in the DPB with the same nuh_layer_id as the current
picture and PicOrderCntVal equal to FullPocLt[ i ][ k ] )
                        RefPicList[ i ][ j ] = picA
                    else
                        RefPicList[ i ][ j ] = "no reference picture"
                    RefPicLtPocList[ i ][ j ] = FullPocLt[ i ][ k ]
                }
                k++
            }
        } else {
            layerIdx =
DirectDependentLayerIdx[ GeneralLayerIdx[ nuh_layer_id ] ][ ilrp_idx[ i ][ RplsIdx ][ j ] ]
            refPicLayerId = vps_layer_id[ layerIdx ]
            if( there is a reference picture picA in the DPB with nuh_layer_id equal to refPicLayerId
and the same PicOrderCntVal as the current picture )
                RefPicList[ i ][ j ] = picA
            else
                RefPicList[ i ][ j ] = "no reference picture"
        }
        fRefWidth is set equal to PicOutputWidthL of the reference picture RefPicList[ i ][ j ] in
luma samples
        fRefHeight is set equal to PicOutputHeightL of the reference picture RefPicList[ i ][ j ] in
luma samples
        RefPicScale[ i ][ j ][ 0 ] =
( ( fRefWidth << 14 ) + ( PicOutputWidthL >> 1 ) ) / PicOutputWidthL
        RefPicScale[ i ][ j ][ 1 ] =
( ( fRefHeight << 14 ) + ( PicOutputHeightL >> 1 ) ) / PicOutputHeightL
        RefPicIsScaled[ i ][ j ] = ( RefPicScale[ i ][ j ][ 0 ] != (1 << 14 ) )
                ( RefPicScale[ i ][ j ][ 1 ] != ( 1 << 14 ) )
    }
}
```

For each i equal to 0 or 1, the first NumRefIdxActive[i] entries in RefPicList[i] are referred to as the active entries in RefPicList[i], and the other entries in RefPicList[i] are referred to as the inactive entries in RefPicList[i].

NOTE—It is possible that a particular picture is referred to by both an entry in RefPicList[0] and an entry in RefPicList[1]. It is also possible that a particular picture is referred to by more than one entry in RefPicList[0] or by more than one entry in RefPicList[I].

DPB. Each inactive entry in RefPicList[0] or RefPicList[0] that is equal to "no reference picture" should be ignored. An unintentional picture loss should be inferred for each active entry in RefPicList[0] or RefPicList[1] that is equal to "no reference picture".

It is a requirement of bitstream conformance that the following constraints apply:

For each i equal to 0 or 1, num_ref_entries[i][RplsIdx[i]] shall not be less than NumRefIdxActive[i].

The picture referred to by each active entry in RefPicList[0] or RefPicList[1] shall be present in the DPB and shall have TemporalId less than or equal to that of the current picture.

The picture referred to by each entry in RefPicList[0] or RefPicList[1] shall not be the current picture and shall have non_reference_picture_flag equal to 0.

An STRP entry in RefPicList[0] or RefPicList[1] of a slice of a picture and an LTRP entry in RefPicList[0] or RefPicList[1] of the same slice or a different slice of the same picture shall not refer to the same picture.

There shall be no LTRP entry in RefPicList[0] or RefPicList[1] for which the difference between the PicOrderCntVal of the current picture and the PicOrderCntVal of the picture referred to by the entry is greater than or equal to $2^{24}$.

Let setOfRefPics be the set of unique pictures referred to by all entries in RefPicList[0] that have the same nuh_layer_id as the current picture and all entries in RefPicList[1] that have the same nuh_layer_id as the current picture. The number of pictures in setOfRefPics shall be less than or equal to MaxDecPicBuffMinus1 and setOfRefPics shall be the same for all slices of a picture.

When the current picture is an STSA picture, there shall be no active entry in RefPicList[0] or RefPicList[1] that has TemporalId equal to that of the current picture.

When the current picture is a picture that follows, in decoding order, an STSA picture that has TemporalId equal to that of the current picture, there shall be no picture that has TemporalId equal to that of the current picture included as an active entry in RefPicList[0] or RefPicList[1] that precedes the STSA picture in decoding order.

When the current picture is a CRA picture, there shall be no picture referred to by an entry in RefPicList[0] or RefPicList[I] that precedes, in output order or decoding order, any preceding IRAP picture in decoding order (when present).

When the current picture is a trailing picture, there shall be no picture referred to by an active entry in RefPicList[0] or RefPicList[1] that was generated by the decoding process for generating unavailable reference pictures for the TRAP picture associated with the current picture.

When the current picture is a trailing picture that follows, in both decoding order and output order, one or more leading pictures associated with the same TRAP picture, if any, there shall be no picture referred to by an entry in RefPicList[0] or RefPicList[1] that was generated by the decoding process for generating unavailable reference pictures for the TRAP picture associated with the current picture.

When the current picture is a recovery point picture or a picture that follows the recovery point picture in output order, there shall be no entry in RefPicList[0] or RefPicList[1] that contains a picture that was generated by the decoding process for generating unavailable reference pictures for the GDR picture of the recovery point picture.

When the current picture is a trailing picture, there shall be no picture referred to by an active entry in RefPicList[0] or RefPicList[1] that precedes the associated TRAP picture in output order or decoding order.

When the current picture is a RADL picture, there shall be no active entry in RefPicList[0] or RefPicList[0] that is any of the following:

A RASL picture

A picture that was generated by the decoding process for generating unavailable reference pictures A picture that precedes the associated TRAP picture in decoding order The picture referred to by each ILRP entry in RefPicList[0] or RefPicList[1] of a slice of the current picture shall be in the same AU as the current picture.

The picture referred to by each ILRP entry in RefPicList[0] or RefPicList[1] of a slice of the current picture shall be present in the DPB and shall have nuh_layer_id less than that of the current picture.

Each ILRP entry in RefPicList[0] or RefPicList[1] of a slice shall be an active entry.

JVET-P2001 further provides the following decoding process for reference picture marking:

This process is invoked once per picture, after decoding of a slice header and the decoding process for reference picture list construction for the slice as specified above, but prior to the decoding of the slice data. This process may result in one or more reference pictures in the DPB being marked as "unused for reference" or "used for long-term reference".

A decoded picture in the DPB can be marked as "unused for reference", "used for short-term reference" or "used for long-term reference", but only one among these three at any given moment during the operation of the decoding process. Assigning one of these markings to a picture implicitly removes another of these markings when applicable. When a picture is referred to as being marked as "used for reference", this collectively refers to the picture being marked as "used for short-term reference" or "used for long-term reference" (but not both).

STRPs and ILRPs are identified by their nuh_layer_id and PicOrderCntVal values. LTRPs are identified by their nuh_layer_id values and the Log 2(MaxLtPicOrderCntLsb) LSBs of their PicOrderCntVal values. If the current picture is a CLVSS picture, all reference pictures currently in the DPB (if any) with the same nuh_layer_id as the current picture are marked as "unused for reference".

Otherwise, the following applies:

For each LTRP entry in RefPicList[0] or RefPicList[1], when the picture is an STRP with the same nuh_layer_id as the current picture, the picture is marked as "used for long-term reference".

Each reference picture with the same nuh_layer_id as the current picture in the DPB that is not referred to by any entry in RefPicList[0] or RefPicList[I] is marked as "unused for reference".

For each ILRP entry in RefPicList[0] or RefPicList[1], the picture is marked as "used for long-term reference".

The reference picture list signaling provided in JVET-P2001 may be less than ideal. In particular, for example, as provided above, in JVET-P2001, the signaling of syntax element pic_rpl_sps_flag[i] in a picture header and the signaling of slice_rpl_sps_flag[i] in a slice header are conditioned such that the determining the condition includes checking the value of syntax element pps_ref_pic_list_sps_idc[i] included in a picture parameter set. Additionally, it should be noted that determining the condition includes determining other conditions such that, syntax elements pic_rpl_sps_flag[i] and slice_rpl_sps_flag[i] may not be present when pps_ref_pic_list_sps_idc[i] is not equal to 0. Such signaling may be less than ideal as syntax element pps_ref_pic_list_sps_idc[i] is not present under certain conditions.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
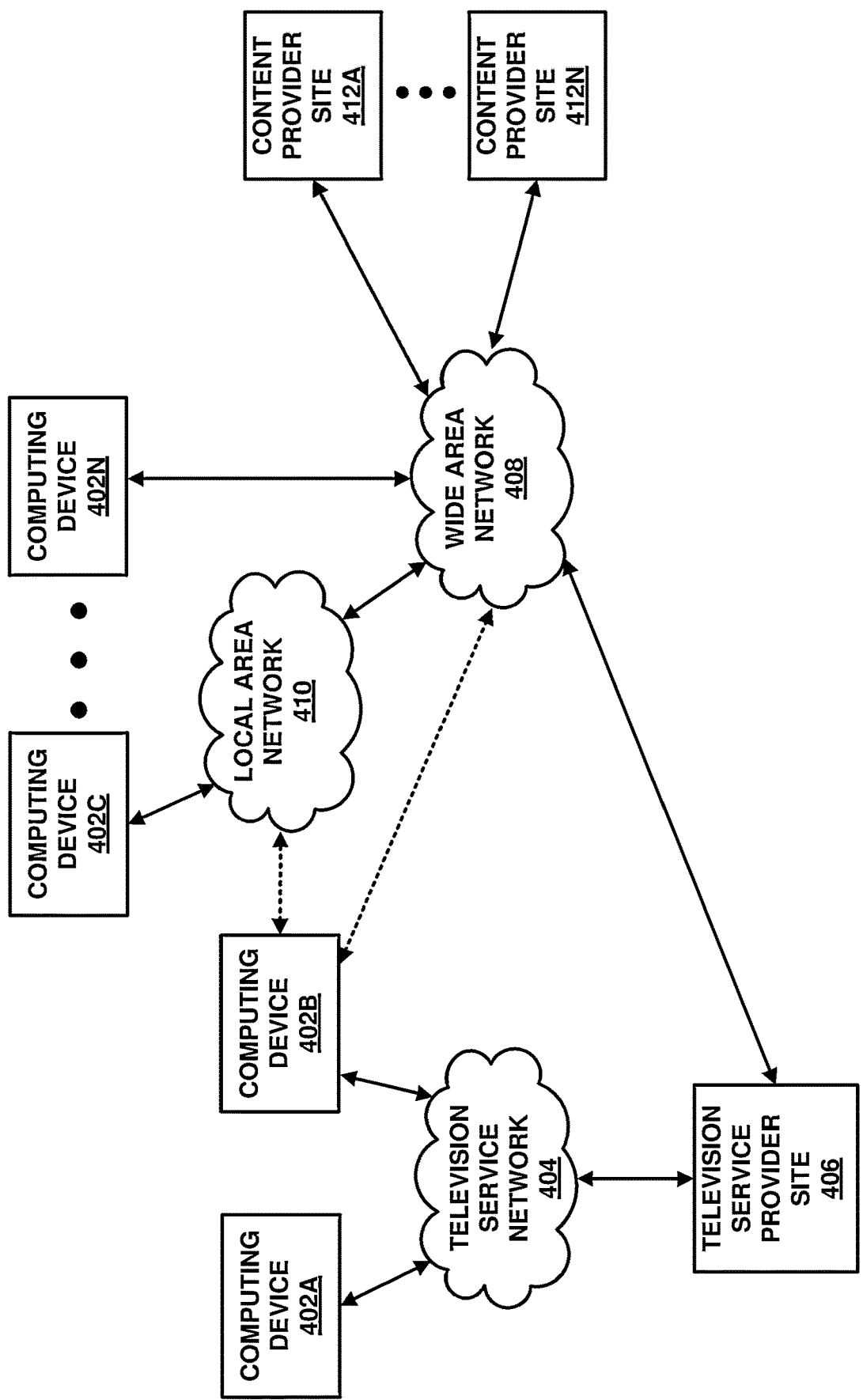
FIG. 4 is a conceptual drawing illustrating an example of components that may be included in an implementation of a system that may be configured to encode and decode video data according to one or more techniques of this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, $3^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data.

Figure 5:
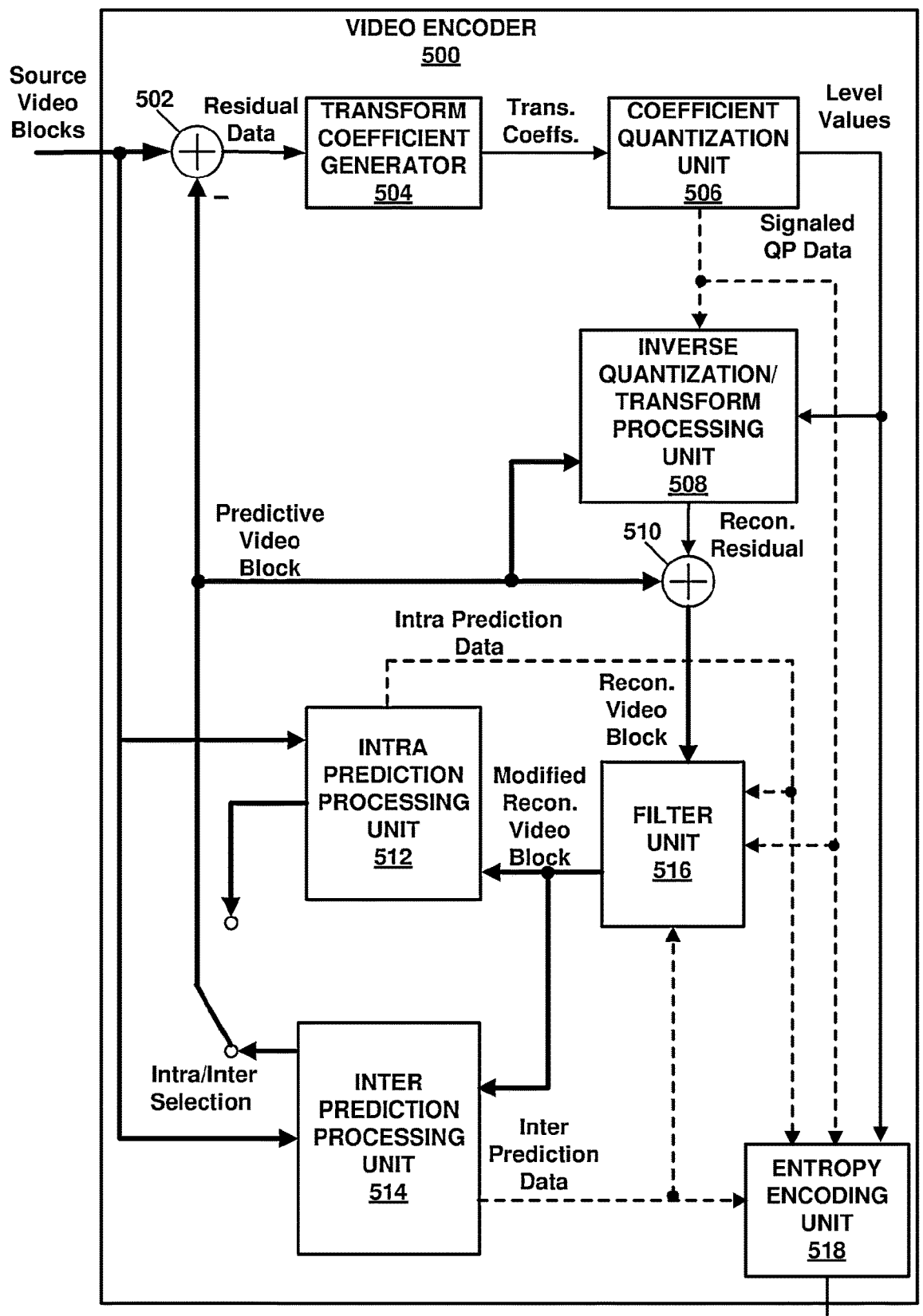
FIG. 5 is a block diagram illustrating an example of a video encoder that may be configured to encode video data according to one or more techniques of this disclosure.

A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional subdivisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or subdivisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients.

As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a prediction mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a prediction unit of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclosure.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

As described above, the reference picture list signaling provided in JVET-P2001 may be less than ideal. In particular, as described above, the signaling of syntax element pic_rpl_sps_flag[i] in a picture header and the signaling of slice_rpl_sps_flag[i] in a slice header are conditioned such that the determining the condition includes checking the value of syntax element pps_ref_pic_list_sps_idc[i] included in a picture parameter set, which may be less than ideal as syntax element pps_ref_pic_list_sps_idc[i] is not present under certain conditions. In particular, the syntax element pps_ref_pic_list_sps_idc[i] is conditionally present only when constant_slice_header_params_enabled_flag is equal to 1. In one example, according to the techniques herein, inference rules for the syntax element pps_ref_pic_list_sps_idc[i] are provided when it is not present. In one example, according to the techniques herein, the semantics of pps_ref_pic_list_sps_idc may be based on the following: pps_ref_pic_list_sps_idc[i] equal to 0 specifies that the syntax element pic_rpl_sps_flag[i] is present in PHs referring to the PPS or slice_rpl_sps_flag[i] may be present in slice header referring to the PPS. pps_ref_pic_list_sps_idc[i]

equal to 1 or 2 specifies that the syntax element pic_rpl_sps_flag[i] is not present in PHs referring to the PPS and slice_rpl_sps_flag[i] is not present in slice header referring to the PPS. pps_ref_pic_list_sps_idc[i] equal to 3 is reserved for future use by ITU-T|ISO/IEC.

When not present pps_ref_pic_list_sps_idc[i] is inferred to be equal to 0, for i in the range of 0 to 1, inclusive.

In another example, when not present pps_ref_pic_list_sps_idc[i] is inferred to be equal to 1, for i in the range of 0 to 1, inclusive.

Further, in JVET-P2001, the semantics of syntax element slice_rpl_sps_flag[i] in the slice header result in incorrect inferences. In particular, according to the semantics of slice_rpl_sps_flag[i], provided in JVET-P2001, when pic_rpl_present_flag is equal to 1, the value of slice_rpl_sps_flag[i] is incorrectly inferred to be equal to pic_rpl_sps_flag[i]. This may cause an incorrect inference of the presence of slice_rpl_idx[i], when pic_rpl_present_flag is equal to 1. Further, when pic_rpl_present_flag is equal to 1, the syntax elements slice_rpl_sps_flag[i] and slice_rpl_idx[i] are actually not present. According to the techniques herein, the value of slice_rpl_sps_flag[i] may be inferred to be equal to 0 when pic_rpl_present_flag is equal to 1. That is, in one example, according to the techniques herein, the semantics of syntax element slice_rpl_sps_flag[i] may be based on the following:

slice_rpl_sps_flag[i] equal to 1 specifies that reference picture list i of the current slice is derived based on one of the ref_pic_list_struct(listIdx, rplsIdx) syntax structures with listIdx equal to i in the SPS. slice_rpl_sps_flag[i] equal to 0 specifies that reference picture list i of the current slice is derived based on the ref_pic_list_struct(listIdx, rplsIdx) syntax structure with listIdx equal to i that is directly included in the slice headers of the current picture.
When slice_rpl_sps_flag[i] is not present, the following applies:
  If pic_rpl_present_flag is equal to 1, the value of slice_rpl_sps_flag[i] is inferred to be equal to 0.
  Otherwise, if num_ref_pic_lists_in_sps[i] is equal to 0, the value of ref_pic_list_sps_flag[i] is inferred to be equal to 0.
  Otherwise, if num_ref_pic_lists_in_sps[i] is greater than 0 and if rpl1_idx_present_flag is equal to 0, the value of slice_rpl_sps_flag[1] is inferred to be equal to slice_rpl_sps_flag[0].
  Otherwise, the value of slice_rpl_sps_flag[i] is inferred to be equal to pps_ref_pic_list_sps_idc[i]−1.

In another example:
If pic_rpl_present_flag is equal to 0:
  if num_ref_pic_lists_in_sps[i] is equal to 0, the value of ref_pic_list_sps_flag[i] is inferred to be equal to 0.
  Otherwise, if num_ref_pic_lists_in_sps[i] is greater than 0 and if rpl1_idx_present_flag is equal to 0, the value of slice_rpl_sps_flag[1] is inferred to be equal to slice_rpl_sps_flag[0].
  Otherwise, the value of slice_rpl_sps_flag[i] is inferred to be equal to pps_ref_pic_list_sps_idc[i]−1.

Further, in JVET-P2001, the semantics of rpl1_idx_present_flag incorrectly account for the reference picture list related signaling in a picture header and a slice header. In one example, according to the techniques herein, the semantics of syntax element rpl1_idx_present_flag may be based on the following to correctly account for the reference picture list related signaling in picture header and slice header.

rpl1_idx_present_flag equal to 0 specifies that pic_rpl_sps_flag[1] and pic_rpl_idx[1] are not present in the picture header referring to the PPS and slice_rpl_sps_flag[1] and slice_rpl_idx[1] are not present in slice headers referring to the PPS. rpl1_idx_present_flag equal to 1 specifies that pic_rpl_sps_filag[1] and pic_rpl_idx[1] may be present in the picture header referring to the PPS and slice_rpl_sps_flag[1] and slice_rpl_idx[1] may be present in slice headers referring to the PPS.

Further, in JVET-P2001, syntax element rpl1_idx_present_flag controls the presence of both the index (pic_rpl_idx[i], slice_rpl_idx[1]) and the flags (pic_rpl_sps_flag[1], slice_rpl_sps_flag[1]). As a result, the syntax elements in PPS pps_ref_pic_list_sps_idc[1] and rpl1_idx_present_flag both specify information regarding the presence of syntax element pic_rpl_sps_flag[1] in picture headers referring to the PPS or syntax element slice_rpl_sps_flag[i] in slice header referring to the PPS. In JVET-P2001, both these syntax elements, pps_ref_pic_list_sps_idc[1] and rpl1_idx_present_flag, are signalled independently and it is possible to signal contradictory values for these syntax elements. In one example, according to the techniques herein, to improve signaling the location of syntax element rpl1_idx_present_flag in PPS may be moved and rpl1_idx_present_flag may be conditionally signaled based on the value of pps_ref_pic_list_sps_idc[1]. It should be noted that this also provides a bit-savings. Table 9 illustrates an example of the relevant portion of the syntax structure of the PPS indicating whether a ref_pic_list_struct( ) syntax structure is present in a slice header, according to the techniques herein.

TABLE 9

|  | Descriptor |
| --- | --- |
| pic_parameter_set_rbsp( ) { |  |
|   pps_pic_parameter_set_id | ue(v) |
|   pps_seq_parameter_set_id | u(4) |
|   ... |  |
|   output_flag_present_flag | u(1) |
|   mixed_nalu_types_in_pic_flag | u(1) |
|   ... |  |
|   for( i = 0; i < 2; i++ ) |  |
|     num_ref_idx_default_active_minus1[ i ] | ue(v) |
|   init_qp_minus26 | se(v) |
|   ... |  |
|   constant_slice_header_params_enabled_flag | u(1) |
|   if( constant_slice_header_params_enabled_flag ) { |  |
|     pps_dep_quant_enabled_idc | u(2) |
|     for( i = 0; i < 2: i++ ) |  |
|       pps_ref_pic_list_sps_idc[ i ] | u(2) |

TABLE 9-continued

|  | Descriptor |
|---|---|
| pps_mvd_l1_zero_idc | u(2) |
| pps_collocated_from_l0_idc | u(2) |
| pps_six_minus_max_num_merge_cand_plus1 | ue(v) |
| pps_max_num_merge_cand_minus_max_num_triangle_cand_plus1 | ue(v) |
| } | |
| if( !constant_slice_header_params_enabled_flag \|\| (constant_slice_header_params_enabled_flag && (pps_ref_pic_list_sps_idc[ 1 ] = = 0 \|\| pps_ref_pic_list_sps_idc[ 1 ] = = 3 ) ) ) | |
|   rpl1_idx_present_flag | u(1) |
|   picture_header_extension_present_flag | u(1) |
|   slice_header_extension_present_flag | u(1) |
|   pps_extension_flag | u(1) |
|   if( pps_extension_flag ) | |
|     while( more_rbsp_data( ) ) | |
|       pps_extension_data_flag | u(1) |
|   rbsp_trailing_bits( ) | |
| } | |

With respect to Table 9, the semantics may be based on the semantics above provided with respect to Table 5 and, in one example, the semantics of syntax element rpl1_idx_present_flag may be based on the following:

rpl1_idx_present_flag equal to 0 specifies that pic_rpl_sps_flag[1] and pic_rpl_idx[1]J are not present in the picture header referring to the PPS and slice_rpl_sps_flag[1] and slice_rpl_idx[I] are not present in slice headers referring to the PPS. rpl1_idx_present_flag equal to 1 specifies that pic_rpl_sps_flag[1] and pic_rpl_idx[1] may be present in the picture header referring to the PPS and slice_rpl_sps_flag[1] and slice_rpl_idx[1] may be present in slice headers referring to the PPS.
When not present rpl1_idx_present_flag is inferred to be equal to 0.
  In another example: When not present rpl1_idx_present_flag is inferred to be equal to 1.

Additionally, in this case, in one example, the semantics of syntax element pic_rpl_sps_flag in a picture header and the semantics of syntax element slice_rpl_sps_flag in a picture header may be based on the following:
pic_rpl_sps_flag[i] equal to 1 specifies that reference picture list i for the picture associated with the PH is derived based on one of the ref_pic_list_struct(listIdx, rplsIdx) syntax structures with listIdx equal to i in the SPS. ref_pic_list_sps_flag[i] equal to 0 specifies that reference picture list i of the picture is derived based on the ref_pic_list_struct (listIdx, rplsIdx) syntax structure with listIdx equal to i that is directly included in the PH.
When pic_rpl_sps_flag[i] is not present, the following applies:
  If num_ref_pic_lists_in_sps[i] is equal to 0, the value of pic_rpl_sps_flag[i] is inferred to be equal to 0.
  Otherwise, if rpl1_idx_present_flag is not present, the value of pic_rpl_sps_flag[i] is inferred to be equal to pps_ref_pic_list_sps_idc[i]−1.
  Otherwise, if num_ref_pic_lists_in_sps[i] is greater than 0 and rpl1_idx_present_flag is equal to 0, the value of pic_rpl_sps_flag[1] is inferred to be equal to pic_rpl_sps_flag[0].

slice_rpl_sps_flag[i] equal to 1 specifies that reference picture list i of the current slice is derived based on one of the ref_pic_list_struct(listIdx, rplsIdx) syntax structures with listIdx equal to i in the SPS. slice_rpl_sps_flag[i] equal to 0 specifies that reference picture list i of the current slice is derived based on the ref_pic_list_struct(listIdx, rplsIdx) syntax structure with listIdx equal to i that is directly included in the slice headers of the current picture.
When slice_rpl_sps_flag[i] is not present, the following applies:
  If pic_rpl_present_flag is equal to 1, the value of slice_rpl_sps_flag[i] is inferred to be equal to pic_rpl_sps_flag[i].
  Otherwise, if num_ref_pic_lists_in_sps[i] is equal to 0, the value of ref_pic_list_sps_flag[i] is inferred to be equal to 0.
  Otherwise, if rpl1_idx_present_flag is not present, the value of slice_rpl_sps_flag[i] is inferred to be equal to pps_ref_pic_list_sps_idc[1]−1.
  Otherwise, if num_ref_pic_lists_in_sps[i] is greater than 0 and if rpl1_idx_present_flag is equal to 0, the value of slice_rpl_sps_flag[1] is inferred to be equal to slice_rpl_sps_flag[0].
In one example, in Table 9, the condition:

if(!constant_slice_header_params_enabled_flag\|\|(constant_slice_header_params_enabled_flag
&&(pps_ref_pic_list_sps_idc[1]==0\|\|pps_ref_pic_list_sps_idc[1]==3)))

May instead be written as:

if(!constant_slice_header_params_enabled_flag\|\|(constant_slice_header_params_enabled_flag
&&(pps_ref_pic_list_sps_idc[1]!=1\|\|pps_ref_pic_list_sps_idc[1]!=2)))

Table 10 illustrates another example of the relevant portion of the syntax structure of the PPS indicating whether a ref_pic_list_struct( ) syntax structure is present in a slice header, according to the techniques herein.

TABLE 10

|  | Descriptor |
|---|---|
| pic_parameter_set_rbsp( ) { | |
|   pps_pic_parameter_set_id | ue(v) |
|   pps_seq_parameter_set_id | u(4) |

TABLE 10-continued

| | Descriptor |
|---|---|
| ... | |
|   output_flag_present_flag | u(1) |
|   mixed_nalu_types_in_pic_flag | u(1) |
| ... | |
|   for( i = 0; 1 < 2; i++ ) | |
|     num_ref_idx_default_active_minus1[ i ] | ue(v) |
|   init_qp_minus26 | se(v) |
| ... | |
|   constant_slice_header_params_enabled_flag | u(1) |
|   if( constant_slice_header_params_enabled_flag ) { | |
|     pps_dep_quant_enabled_idc | u(2) |
|     for( i = 0; i < 2; i++ ) | |
|       pps_ref_pic_list_sps_idc[ i ] | u(2) |
|     pps_mvd_l1_zero_idc | u(2) |
|     pps_collocated_from_l0_idc | u(2) |
|     pps_six_minus_max_num_merge_cand_plus1 | ue(v) |
|     pps_max_num_merge_cand_minus_max_num_triangle_cand_plus1 | ue(v) |
|   } | |
| if( pps_ref_pic_list_sps_idc[ 1 ] = = 0 \|\| pps_ref_pic_list_sps_idc[ 1 ] = = 3 ) | |
|   rpl1_idx_present_flag | u(1) |
|   picture_header_extension_present_flag | u(1) |
|   slice_header_extension_present_flag | u(1) |
|   pps_extension_flag | u(1) |
|   if( pps_extension_flag ) | |
|     while( more_rbsp_data( ) ) | |
|       pps_extension_data_flag | u(1) |
|   rbsp_trailing_bits( ) | |
| } | |

In one example, in Table 10, the condition:

if(pps_ref_pic_list_sps_idc[1]==0‖pps_ref_pic_list_sps_idc[1]==3)

May instead be written as:

if(pps_ref_pic_list_sps_idc[1]!=1‖pps_ref_pic_list_sps_idc[1]!=2)

Further, in one example according to the techniques herein, the one or more of the following constraints may be imposed on syntax element rpl1_idx_present_flag:
If constant_slice_header_params_enabled_flag is equal to 1 and pps_ref_pic_list_sps_idc[1] is equal to 0, rpl1_idx_presence_flag shall be equal to 1.
Additionally (or alternatively):
If constant_slice_header_params_enabled_flag is equal to 1 and rpl1_idx_presence_flag is equal to 0, pps_ref_pic_list_sps_idc[1] shall not be equal to 0.
Additionally (or alternatively):
If constant_slice_header_params_enabled_flag is equal to 1 and pps_ref_pic_list_sps_idc[1] is equal to 0, rpl1_idx_presence_flag shall not be equal to 0.

Additionally:
If constant_slice_header_params_enabled_flag is equal to 1 and pps_ref_pic_list_sps_idc[1] is equal to 1 or 2, rpl1_idx_presence_flag shall be equal to 0.

In one example, according to the techniques herein, pps_ref_pic_list_sps_idc[1] may be signaled only when rpl1_idx_present_flag is equal to 1. It should be noted that if pps_ref_pic_list_sps_idc[1] is signaled when rpl1_idx_present_flag is equal to 0, then it can result in contradictory information about presence of pic_rpl_sps_flag[i] in picture headers or slice_rpl_sps_flag[i] in slice headers. For example, if pps_ref_pic_list_sps_idc[1] is equal to 0 it specifies that that the syntax element pic_rpl_sps_flag[i] is present in picture headers referring to the PPS or ref_pic_list_sps_flag[i] is present in slice header referring to the PPS (JVET-P2001 specifies that the syntax element sps_flag[i] is present in slice header of slices referring to the PPS) and rpl1_idx_present_flag is equal to 0 specifies that ref_pic_list_sps_flag[1] and ref_pic_list_idx[1] are not present in slice headers. Table 11 illustrates another example of the relevant portion of the syntax structure of the PPS indicating whether a ref_pic_list_struct( ) syntax structure is present in a slice header, according to the techniques herein.

TABLE 11

| | Descriptor |
|---|---|
| pic_parameter_set_rbsp( ) { | |
|   pps_pic_parameter_set_id | ue(v) |
|   pps_seq_parameter_set_id | u(4) |
| ... | |
|   output_flag_present_flag | u(1) |
|   mixed_nalu_types_in_pic_flag | u(1) |
| ... | |
|   for( i = 0; i < 2; i++ ) | |
|     num_ref_idx_default_active_minus1[ i ] | ue(v) |
|   rpl1_idx_present_flag | u(1) |
|   init_qp_minus26 | se(v) |
| ... | |
|   constant_slice_header_params_enabled_flag | u(1) |

TABLE 11-continued

|  | Descriptor |
|---|---|
| if( constant_slice_header_params_enabled_flag ) { | |
|   pps_dep_quant_enabled_idc | u(2) |
|   for( i = 0; i < rpl1_idx_present_flag ? 2:1; i++ ) | |
|     pps_ref_pic_list_sps_idc[ i ] | u(2) |
|   pps_mvd_l1_zero_idc | u(2) |
|   pps_collocated_from_l0_idc | u(2) |
|   pps_six_minus_max_num_merge_cand_plus1 | ue(v) |
|   pps_max_num_merge_cand_minus_max_num_triangle_cand_plus1 | ue(v) |
| } | |
| picture_header_extension_present_flag | u(1) |
| slice_header_extension_present_flag | u(1) |
| pps_extension_flag | u(1) |
| if( pps_extension_flag) | |
|   while( more_rbsp_data( ) ) | |
|     pps_extension_data_flag | u(1) |
| rbsp_trailing_bits( ) | |
| } | |

With respect to Table 11, the semantics may be based on the semantics above provided with respect to Table 5 and, in one example, the semantics of syntax element pps_ref_pic_list_sps_idc may be based on the following:

pps_ref_pic_list_sps_idc[i] equal to 0 specifies that the syntax element pic_rpl_sps_flag[i] is present in PHs referring to the PPS or slice_rpl_sps_flag[i] is present in slice header referring to the PPS. pps_ref_pic_list_sps_idc[i] equal to 1 or 2 specifies that the syntax element pic_rpl_sps_flag[i] is not present in PHs referring to the PPS and slice_rpl_sps_flag[i] is not present in slice header referring to the PPS. pps_ref_pic_list_sps_idc[i] equal to 3 is reserved for future use by ITU-T|ISO/IEC. When pps_ref_pic_list_sps_idc[1] is not present, it specifies that the syntax element pic_rpl_sps_flag[i] is not present in PHs referring to the PPS and slice_rpl_sps_flag[i] is not present in slice header referring to the PPS.

In another example:
When rpl1_idx_present_flag is equal to 0 (i.e. when pps_ref_pic_list_sps_idc[1] is not present), it specifies that the syntax element pic_rpl_sps_flag[i] is not present in PHs referring to the PPS and slice_rpl_sps_flag[i] is not present in slice header referring to the PPS.

In another example:
When rpl1_idx_present_flag is equal to 0, pps_ref_pic_list_sps_idc[1] is inferred to be equal to pps_ref_pic_list_sps_idc[0].

In another example:
When pps_ref_pic_list_sps_idc[1] is not present, it is inferred to be equal to pps_ref_pic_list_sps_idc[0].

In one example, according to the techniques herein, the condition for calculation of AbsDeltaPocSt[listIdx][rplsIdx][i] may be signaled with a minus one for the 0-th entry. It is asserted that since for the 0-th entry the abs_delta_poc_st[listIdx][rplsIdx][0] specifies the delta between the picture order count values of the current picture and the picture referred to by the 0-th entry, this value can be coded with a minus1 coding. This provides bit-savings as the syntax element abs_delta_poc_st[listIdx][rplsIdx][i] is ue(v) coded and thus coding a value minus 1 compared to coding a value requires fewer bits. That is, in one example, according to the techniques herein, the semantics of syntax element abs_delta_poc_st[listIdx][rplsIdx][i] may be based on the following:

abs_delta_poc_st[listIdx][rplsIdx][i] specifies the value of the variable AbsDeltaPocSt[listIdx][rplsIdx][i] as follows:

```
if( (sps_weighted_pred_flag || sps_weighted_bipred_flag) &&
   (i != 0))
    AbsDeltaPocSt[ listIdx ][ rplsIdx ][ i ] =
    abs_delta_poc_st[ listIdx ][ rplsIdx ][ i ]
else
    AbsDeltaPocSt[ listIdx ][ rplsIdx ][ i ] =
    abs_delta_poc_st[ listIdx ][ rplsIdx ][ i ] + 1
```

The value of abs_delta_poc_st[listIdx][rplsIdx][i] shall be in the range of 0 to $2^{15}-1$, inclusive.

It should be noted that in the ref_pic_list_struct( ) syntax structure provided in JVET-P2001, as illustrated in Table 4, the condition for signaling ltrp_in_slice_header_flag[listIdx][rplsIdx] allows ltrp_in_slice_header_flag[listIdx][rplsIdx] to be signaled in the case where num_ref_entries[listIdx][rplsIdx] is equal to 0. When num_ref_entries[listIdx][rplsIdx] is equal to 0, there are no long-term reference picture entries in the particular reference picture list. Thus, in this case, the signaling of ltrp_in_slice_header_flag[listIdx][rplsIdx] is not useful, is meaningless, and wastes a bit and parsing resources. In one example, according to the techniques herein, a ref_pic_list_struct( ) syntax structure only signals ltrp_in_slice_header_flag[listIdx][rplsIdx] when num_ref_entries[listIdx][rplsIdx] is greater than 0. Table 12 illustrates an example of a ref_pic_list_struct( ) syntax structure according to the techniques herein.

TABLE 12

|  | Descriptor |
|---|---|
| ref_pic_list_struct( listIdx, rplsIdx ) { | |
|   num_ref_entries[ listIdx ][ rplsIdx ] | ue(v) |
|   if( long_term_ref_pics_flag && num_ref_entries[ listIdx ][ rplsIdx ] > 0) | |
|     ltrp_in_slice_header_flag[ listIdx ][ rplsIdx ] | u(1) |
|   for( i = 0, j = 0; i < num_ref_entries[ listIdx ][ rplsIdx ]; i++) { | |
|     if( inter_layer_ref_pics_present_flag ) | |

TABLE 12-continued

| | Descriptor |
|---|---|
| inter_layer_ref_pic_flag[ listIdx ][ rplsIdx ][ i ] | u(1) |
| if( !inter_layer_ref_pics_flag[ listIdx ][ rplsIdx ][ i ] ) { | |
|   if( long_term_ref_pics_flag ) | |
|     st_ref_pic_flag[ listIdx ][ rplsIdx ][ i ] | u(1) |
|   if( st_ref_pic_flag[ listIdx ][ rplsIdx ][ i ] ) { | |
|     abs_delta_poc_st[ listIdx ][ rplsIdx ][ i ] | ue(v) |
|     if( AbsDeltaPocSt[ listIdx ][ rplsIdx ][ i ] > 0 ) | |
|       strp_entry_sign_flag[ listIdx ][ rplsIdx ][ i ] | u(1) |
|   } else if( !ltrp_in_slice_header_flag[ listIdx ][ rplsIdx ] ) | |
|     rpls_poc_lsb_lt[ listIdx ][ rplsIdx ][ j++ ] | u(v) |
|   } else | |
|     ilrp_idx[ listIdx ][ rplsIdx ][ i ] | ue(v) |
|   } | |
| } | |

With respect to Table 12, the semantics may be based on the semantics provided above.

Further, it should be noted that in one example, ltrp_in_slice_header_flag[listIdx][rplsIdx] may be referred to as ltrp_in_header_flag[listIdx][rplsIdx]. This is because the long-term reference picture information can be signalled in slice header and/or in picture header. In such an example, instances of ltrp_in_slice_header_flag[listIdx][rplsIdx] in synax and semantics may be replaced with ltrp_in_header_flag[listIdx][rplsIdx]. For example, in the syntax and semantics for a slice header and a picture header.

```
if( pic_rpl_present_flag )
    RplsIdx[ i ] = PicRplsIdx[ i ]
else
    RplsIdx[ i ] = slice_rpl_sps_flag[ i ] ? slice_rpl_idx[ i ] :
        num_ref_pic_lists_in_sps[ i ]
```

In one example, according to the techniques herein, the picture_header_rbsp( ) syntax structure may use the derived variable PicRplsIdx[i] related to picture header to signal picture POC LSB information related syntax. Table 13 illustrates an example of a relevant portion of a picture_header_rbsp( ) syntax structure according to the techniques herein.

TABLE 13

| | Descriptor |
|---|---|
| picture_header_rbsp( ) { | |
|   ... | |
|   pic_rpl_present_flag | u(1) |
|   if( pic_rpl_present_flag ) { | |
|     for( i = 0; i < 2; i++ ) { | |
|       if( num_ref_pic_lists_in_sps[ i ] > 0 && !pps_ref_pic_list_sps_idc[ i ] && | |
|         ( i = = 0 \|\| ( i = = 1 && rpl1_idx_present_flag ) ) ) | |
|         pic_rpl_sps_flag[ i ] | u(1) |
|       if( pic_rpl_sps_flag[ i ] ) { | |
|         if( num_ref_pic_lists_in_sps[ i ] > 1 && | |
|           ( i = = 0 \|\| ( i = = 1 && rpl1_idx_present_flag ) ) ) | |
|         pic_rpl_idx[ i ] | u(v) |
|       } else | |
|         ref_pic_list_struct( i, num_ref_pic_lists_in_sps[ i ] ) | |
|       for( j = 0; j < NumLtrpEntries[ i ][ PicRplsIdx[ i ] ]; j++ ) { | |
|         if( ltrp_in_slice_header_flag[ i ][ PicRplsIdx[ i ] ] ) | |
|           pic_poc_lsb_lt[ i ][ j ] | u(v) |
|         pic_delta_poc_msb_present_flag[ i ][ j ] | u(1) |
|         if( pic_delta_poc_msb_present_flag[ i ][ j ] ) | |
|           pic_delta_poc_msb_cycle_lt[ i ][ j ] | ue(v) |
|       } | |
|     } | |
|   } | |
|   ... | |
| } | |

As described above, the variable PicRplsIdx[i] is derived during the parsing of a picture header as follows:

PicRplsIdx[$i$]=pic_rpl_sps_flag[$i$]?pic_rpl_idx[$i$]: num_ref_pic_lists_in_sps[$i$]

and

The variable RplsIdx[i] is derived in the semantics of slice_rpl_idx[i] during the parsing of slice header as follows:

With respect to Table 13, the semantics may be based on the semantics provided above.

In one example, according to the techniques herein, the picture_header_rbsp( ) syntax structure may allow for signalling of reference picture list override information. In such an example, a corresponding modification is made to the signalling in slice header. It should be noted that since the reference picture list information can be signalled at the picture header, allowing signalling the reference picture list override information at the picture header makes a consistent design. It also can provide bit savings by signaling information at the picture level instead of at the slice level. For example, this would be the case if the picture consists of multiple slices. Table 14 illustrates an example of a relevant portion of a picture_header_rbsp( ) syntax structure and Table 15 illustrates an example of a relevant portion of a slice_header_rbsp( ) syntax structure according to the techniques herein.

TABLE 14

|  | Descriptor |
|---|---|
| picture_header_rbsp( ) { | |
| ... | |
|   pic_rpl_present_flag | u(1) |
|   if( pic_rpl_present_flag ) { | |
|     for( i = 0; i < 2; i++ ) { | |
|       if( num_ref_pic_lists_in_sps[ i ] > 0 && !pps_ref_pic_list_sps_idc[ i ] && | |
|         ( i = = 0 \|\| ( i = = 1 && rpl1_idx_present_flag ) ) ) | |
|         pic_rpl_sps_flag[ i ] | u(1) |
|       if( pic_rpl_sps_flag[ i ] ) { | |
|         if( num_ref_pic_lists_in_sps[ i ] > 1 && | |
|           ( i = = 0 \|\| (i = = 1 && rpl1_idx_present_flag ) ) ) | |
|         pic_rpl_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           pic_poc_lsb_lt[ i ][ j ] | u(v) |
|         pic_delta_poc_msb_present_flag[ i ][ j ] | u(1) |
|         if( pic_delta_poc_msb_present_flag[ i ][ j ] ) | |
|           pic_delta_poc_msb_cycle_lt[ i ][ j ] | ue(v) |
|       } | |
|     } | |
|     pic_num_ref_idx_active_override_flag | u(1) |
|     if( pic_num_ref_idx_active_override_flag ) | |
|       for( i = 0; i < 2; i++ ) | |
|         if( num_ref_entries[ i ][ PicRplsIdx[ i ] ] > 1 ) | |
|           pic_num_ref_idx_active_minus1[ i ] | ue(v) |
|   } | |
| ... | |
| } | |

TABLE 15

|  |  |
|---|---|
| slice_header( ) { | |
| ... | |
|   if( !pic_rpl_present_flag &&( ( nal_unit_type != IDR_W_RADL && nal_unit_type != | |
|       IDR_N_LP ) \|\| sps_idr_rpl_present_flag ) ) { | |
|     for( i = 0; i < 2; i++ ) { | |
|       if( num_ref_pic_lists_in_sps[ i ] > 0 && !pps_ref_pic_list_sps_idc[ i ] && | |
|         ( i = = 0 \|\| ( i = = 1 && rpl1_idx_present_flag ) ) ) | |
|         slice_rpl_sps_flag[ i ] | u(1) |
|       if( slice_rpl_sps_flag[ i ] ) { | |
|         if( num_ref_pic_lists_in_sps[ i ] > 1 && | |
|           ( i = = 0 \|\| ( i = = 1 && rpl1_idx_present_flag ) ) ) | |
|           slice_rpl_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           slice_poc_lsb_lt[ i ][ j ] | u(v) |
|         slice_delta_poc_msb_present_flag[ i ][ j ] | u(1) |
|         if( slice_delta_poc_msb_present_flag[ i ][ j ] ) | |
|           slice_delta_poc_msb_cycle_lt[ i ][ j ] | ue(v) |
|       } | |
|     } | |
|   } | |
|   if( !pic_rpl_present_flag && ( ( nal_unit_type != IDR_W_RADL && | |
| nal_unit_type !=IDR_N_LP ) \|\| sps_idr_rpl_present_flag ) ) { | |
|     if( ( slice_type != I && num_ref_entries[ 0 ][ RplsIdx[ 0 ] ] > 1 ) \|\| | |
|       ( slice_type = = B && num_ref_entries[ 1 ][ RplsIdx[ 1 ] ] > 1 ) ) { | |
|       num_ref_idx_active_override_flag | u(1) |

TABLE 15-continued

```
        if( num_ref_idx_active_override_flag )
            for( i = 0; i < ( slice_type = = B ? 2: 1 ); i++ )
                if( num_ref_entries[ i ][ RplsIdx[ i ] ] > 1 )
                    num_ref_idx_active_minus1[ i ]                    ue(v)
            }
        }
    ...
}
```

With respect to Table 14 and Table 15, the semantics may be based on the semantics provided above. With the following example semantics for num_ref_idx_default_active_minus1[i], pic_num_ref_idx_active_override_flag, and pic_num_ref_idx_active_minus1[i]:

num_ref_idx_default_active_minus1 [i] plus 1, when i is equal to 0, specifies the inferred value of the variable NumRefIdxActive[0] with num_ref_idx_active_override_flag equal to 0, and, when i is equal to 1, specifies the inferred value of NumRefIdxActiver[1] with num_ref_idx_active_override_flag equal to 0. The value of num_ref_idx_default_active_minus1 [i] shall be in the range of 0 to 14, inclusive.

pic_num_ref_idx_active_override_flag equal to 1 specifies that the syntax element pic_num_ref_idx_active_minus1[0] and pic_num_ref_idx_active_minus1[1] is present or inferred. pic_num_ref_idx_active_override_flag equal to 0 specifies that the syntax elements pic_num_ref_idx_active_minus1[0] and pic_num_ref_idx_active_minus1[1] are not present. When not present, the value of pic_num_ref_idx_active_override_flag is inferred to be equal to 0.

pic_num_ref_idx_active_minus1[i] is used for the derivation of the variable NumRefIdxActive[i]. The value of pic_num_ref_idx_active_minus1[i] shall be in the range of 0 to 14, inclusive. When pic_num_ref_idx_active_override_flag is equal to 1, and pic_num_ref_idx_active_minus1 [i] is not present, pic_num_ref_idx_active_minus1[i] is inferred to be equal to 0. The variable NumRefIdxActive[i] is derived as follows:

```
for( i = 0; i < 2; i++ ) {
    if( pic_num_ref_idx_active_override_flag )
        NumRefIdxActive[ i ] =
            pic_num_ref_idx_active_minus1[ i ] + 1
    else {
        if( num_ref_entries[ i ][ PicRplsIdx[ i ] ] >=
            num_ref_idx_default_active_minus1[ i ] + 1 )
            NumRefIdxActive[ i ] =
                num_ref_idx_default_active_minus1[ i ] + 1
        else
            NumRefIdxActive[ i ] =
                num_ref_entries[ i ][ PicRplsIdx[ i ] ]
    }
}
```

The value of NumRefIdxActive[i]−1 specifies the maximum reference index for reference picture list i that may be used to decode the slices of the picture. When the value of NumRefIdxActive[i] is equal to 0, no reference index for reference picture list i may be used to decode the slices of the picture.

In one example, two separate flags pic_num_ref_idx_active_override_flag[i] may be signaled (for i equal to 0 and i equal to 1) instead of a single flag pic_num_ref_idx_active_override_flag. This allows individual control of the presence of syntax element pic_num_ref_idx_active_minus1[i] for i equal to 0 and i equal to 1, which provides more flexibility. In such an example, in the picture_header_rbsp( ) in Table 14:

| | |
|---|---|
| pic_num_ref_idx_active_override_flag | u(1) |
| if( pic_num_ref_idx_active_override_flag ) | |
|   for( i = 0; i < 2; i++ ) | |
|     if( num_ref_entries[ i ][ PicRplsIdx[ i ] ] > 1 ) | |
|       pic_num_ref_idx_active_minus1[ i ] | ue(v) | may be replaced with:

| | |
|---|---|
| for( i = 0; i < 2; i++ ) | |
|   pic_num_ref_idx_active_override_flag[ i ] | u(1) |
| for( i = 0; i < 2; i++ ) | |
|   if( pic_num_ref_idx_active_override_flag[ i ] ) | |
|     if( num_ref_entries[ i ][ PicRplsIdx[ i ] ] > 1 ) | |
|       pic_num_ref_idx_active_minus1[ i ] | ue(v) |

Or replaced with

| | |
|---|---|
| for( i = 0; i < 2; i++ ) { | |
|   pic_num_ref_idx_active_override_flag[ i ] | u(1) |
|   if( pic_num_ref_idx_active_override_flag[ i ] ) | |
|     if( num_ref_entries[ i ][ PicRplsIdx[ i ] ] > 1 ) | |
|       pic_num_ref_idx_active_minus1[ i ] | ue(v) |
| } | |

With the syntax element pic_num_ref_idx_active_override_flag[i], in one example, having semantics based on the following:

pic_num_ref_idx_active_override_flag[i] equal to 1 specifies that the syntax element pic_num_ref_idx_active_minus1 [i] is present. pic_num_ref_idx_active_override_flag[i] equal to 0 specifies that the syntax element pic_num_ref_idx_active_minus1[i] is not present. When not present, the value of pic_num_ref_idx_active_override_flag[i] is inferred to be equal to 0.

In this manner, source device 102 represents an example of a device configured to signal a syntax element indicating whether a reference picture list for picture associated with a picture header is derived based on a reference picture list included in a sequence parameter set and conditionally signal a syntax element indicating an index value associated with a reference picture list included in the sequence parameter set based on the value of the syntax element indicating whether a reference picture list for picture associated with a picture header is derived based on a reference picture list included in a sequence parameter set.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, IC, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, PC, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
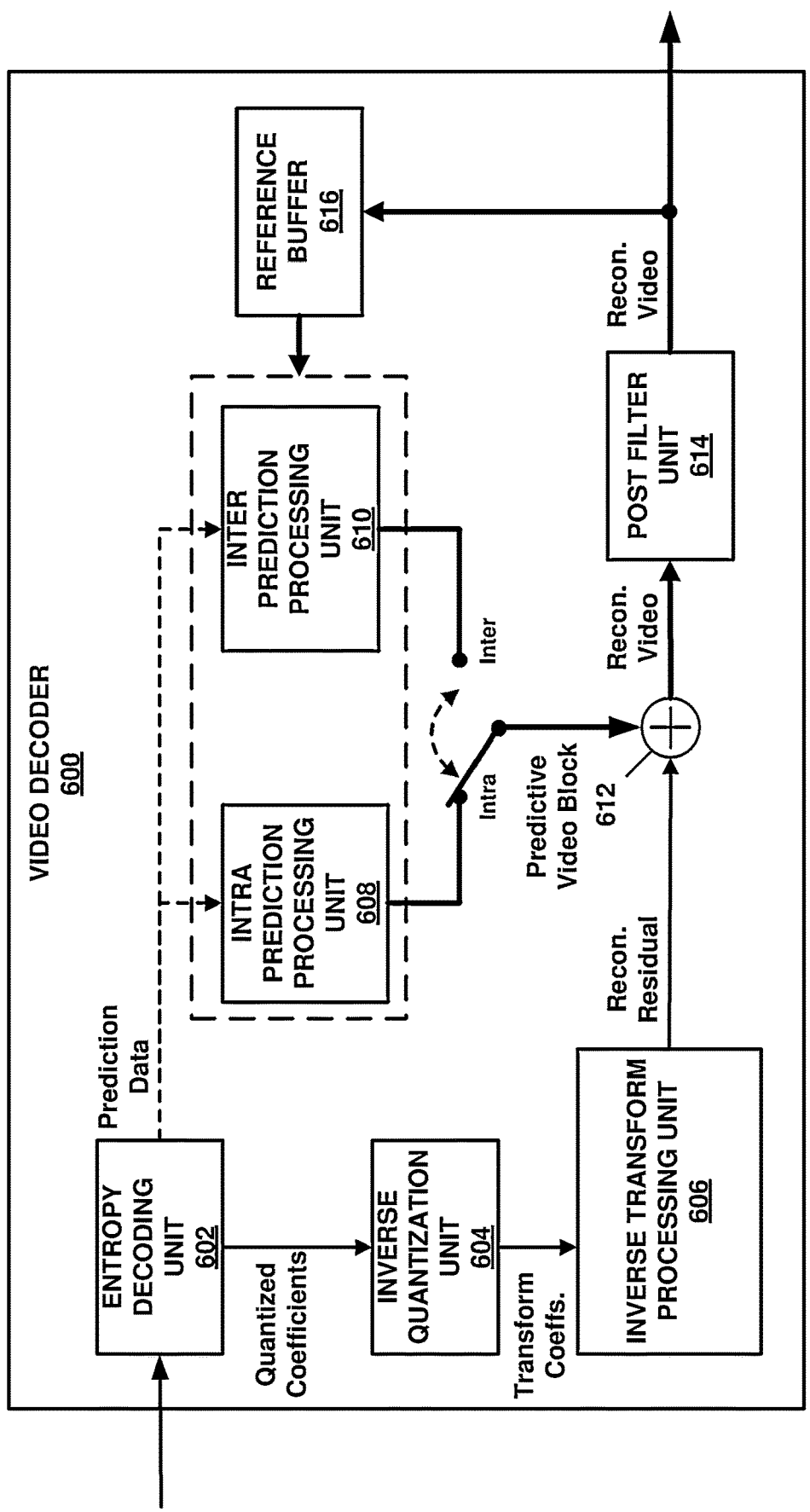
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure (e.g., the decoding process for reference-picture list construction described above). In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-15. Video decoder 600 may decode a picture based on or according to the processes described above, and further based on parsed values in Tables 1-15.

In the example illustrated in FIG. 6, video decoder 600 includes an entropy decoding unit 602, inverse quantization unit 604, inverse transform processing unit 606, intra prediction processing unit 608, inter prediction processing unit 610, summer 612, post filter unit 614, and reference buffer 616. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and prediction data from a bitstream. In the example, illustrated in FIG. 6, inverse quantization unit 604 and inverse transform processing unit 606 receives a quantization parameter, quantized coefficient values, transform data, and prediction data from entropy decoding unit 602 and outputs reconstructed residual data.

Referring again to FIG. 6, reconstructed residual data may be provided to summer 612. Summer 612 may add reconstructed residual data to a predictive video block and generate reconstructed video data. A predictive video block may be determined according to a predictive video technique (i.e., intra prediction and inter frame prediction). Intra prediction processing unit 608 may be configured to receive intra prediction syntax elements and retrieve a predictive video block from reference buffer 616. Reference buffer 616 may include a memory device configured to store one or more frames of video data. Intra prediction syntax elements may identify an intra prediction mode, such as the intra prediction modes described above. Inter prediction processing unit 610 may receive inter prediction syntax elements and generate motion vectors to identify a prediction block in one or more reference frames stored in reference buffer 616. Inter prediction processing unit 610 may produce motion compensated blocks, possibly performing interpolation based on interpolation filters. Identifiers for interpolation filters to be used for motion estimation with sub-pixel precision may be included in the syntax elements. Inter prediction processing unit 610 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to parse a syntax element indicating whether a reference picture list for a picture associated with a picture header is derived based on a reference picture list included in a sequence parameter set and conditionally parse a syntax element indicating an index value associated with a reference picture list included in the sequence parameter set based on the value of the syntax element indicating whether a reference picture list for picture associated with a picture header is derived based on a reference picture list included in a sequence parameter set.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

CROSS REFERENCE

This Nonprovisional application claims priority under 35 U.S.C. § 119 on provisional Applications No. 62/938,603 on Nov. 21, 2019 and No. 62/955,285 on Dec. 30, 2019, the entire contents of which are hereby incorporated by reference.

The invention claimed is:
1. A method of decoding video data, the method comprising:
   parsing a weighted prediction flag and a weighted bi-prediction flag in a sequence parameter set;
   receiving a reference picture list structure;
   parsing a first syntax element specifying a number of entries in the reference picture list structure;
   parsing a second syntax element specifying a value of a first variable, wherein the second syntax element is defined by an index for a range of 0 to a value of the first syntax element minus one;
   setting the value of the first variable, wherein
      in a case that (i) a first condition, which is a value of the weighted prediction flag or a value of the weighted bi-prediction flag is equal to one, is true and (ii) a value of the index is not equal to zero, the value of the first variable is set equal to a value of the second syntax element, and
      in every case that the value of the index is equal to zero, the value of the first variable is set equal to the value of the second syntax element plus one;
   parsing a third syntax element, in a case that the value of the first variable is greater than zero, wherein the third syntax element specifies whether a second variable is greater than or equal to 0; and
   deriving a value for the second variable based on the value of the first variable and a value of the third syntax element.

2. A device of decoding video data, the device comprising:
a processor configured to:
parse a weighted prediction flag and a weighted bi-prediction flag in a sequence parameter set;
receive a reference picture list structure;
parse a first syntax element specifying a number of entries in the reference picture list structure;
parse a second syntax element specifying a value of a first variable, wherein the second syntax element is defined by an index for a range of 0 to a value of the first syntax element minus one;
set the value of the first variable, wherein
in a case that (i) a first condition, which is a value of the weighted prediction flag or a value of the weighted bi-prediction flag is equal to one, is true and (ii) a value of the index is not equal to zero, the value of the first variable is set equal to a value of the second syntax element, and
in every case that the value of the index is equal to zero, the value of the first variable is set equal to the value of the second syntax element plus one;
parse a third syntax element, in a case that the value of the first variable is greater than zero, wherein the third syntax element specifies whether a second variable is greater than or equal to 0; and
derive a value for the second variable based on the value of the first variable and a value of the third syntax element.

3. A method of encoding image data, the method comprising:
signaling a sequence parameter set including a weighted prediction flag and a weighted bi-prediction flag;
signaling a reference picture list structure,
wherein:
the reference picture list structure includes:
(i) a first syntax element specifying a number of entries in the reference picture list structure,
(ii) a second syntax element specifying a value of a first variable, wherein the second syntax element is defined by an index for a range of 0 to a value of the first syntax element minus one,
in a case that (i) a first condition, which is a value of the weighted prediction flag or a value of the weighted bi-prediction flag is equal to one, is true and (ii) a value of the index is not equal to zero, the value of the first variable is set equal to a value of the second syntax element, and
in every case that the value of the index is equal to zero, the value of the first variable is set equal to a value of the second syntax element plus one, and
(iii) a third syntax element, in a case that the value of the first variable is greater than zero, wherein the third syntax element specifies whether a second variable is greater than or equal to 0, and a value for the second variable is derived based on the value of the first variable and a value of the third syntax element.

4. A device of encoding image data, the device comprising:
a processor configured to:
signal a sequence parameter set including a weighted prediction flag and a weighted bi-prediction flag; and
signal a reference picture list structure,
wherein:
the reference picture list structure includes:
(i) a first syntax element specifying a number of entries in the reference picture list structure,
(ii) a second syntax element specifying a value of a first variable, wherein the second syntax element is defined by an index for a range of 0 to a value of the first syntax element minus one,
in a case that (i) a first condition, which is a value of the weighted prediction flag or a value of the weighted bi-prediction flag is equal to one, is true and (ii) a value of the index is not equal to zero, the value of the first variable is set equal to a value of the second syntax element, and
in every case that the value of the index is equal to zero, the value of the first variable is set equal to a value of the second syntax element plus one, and
(iii) a third syntax element, in a case that the value of the first variable is greater than zero, wherein the third syntax element specifies whether a second variable is greater than or equal to 0, and a value for the second variable is derived based on the value of the first variable and a value of the third syntax element.

* * * * *